(12) United States Patent
Liu et al.

(10) Patent No.: US 11,412,463 B2
(45) Date of Patent: Aug. 9, 2022

(54) POWER ADJUSTMENT METHOD, TERMINAL, AND STORAGE MEDIUM

(71) Applicant: HUAWEI TECHNOLOGIES CO., LTD., Shenzhen (CN)

(72) Inventors: Yun Liu, Shenzhen (CN); Jinlei Song, Shanghai (CN); Bingguang Peng, Shanghai (CN); Zhiming Ding, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/259,150

(22) PCT Filed: Jul. 9, 2019

(86) PCT No.: PCT/CN2019/095258
§ 371 (c)(1),
(2) Date: Jan. 8, 2021

(87) PCT Pub. No.: WO2020/011163
PCT Pub. Date: Jan. 16, 2020

(65) Prior Publication Data
US 2021/0176718 A1    Jun. 10, 2021

(30) Foreign Application Priority Data

Jul. 9, 2018  (CN) .......................... 201810746733.8
Aug. 31, 2018  (CN) .......................... 201811012580.0

(51) Int. Cl.
*H04W 52/38* (2009.01)
*H04W 72/04* (2009.01)

(52) U.S. Cl.
CPC ....... *H04W 52/38* (2013.01); *H04W 72/0473* (2013.01)

(58) Field of Classification Search
CPC .. H04W 52/38; H04W 72/0473; H04L 1/0026
USPC ..................................... 455/522, 69
See application file for complete search history.

(56) References Cited

U.S. PATENT DOCUMENTS

| | | | | |
|---|---|---|---|---|
| 6,574,453 B1* | 6/2003 | Honda | ............ | H04B 17/318 |
| | | | | 455/11.1 |
| 6,985,700 B1* | 1/2006 | Laakso | ............ | H04B 1/7103 |
| | | | | 370/329 |
| 7,047,009 B2* | 5/2006 | Laroia | ............ | H04W 36/18 |
| | | | | 455/437 |

(Continued)

OTHER PUBLICATIONS

Office Action dated May 20, 2020 issued in Chinese Application No. 201811012580.0 (15 pages).

(Continued)

*Primary Examiner* — Hai V Nguyen

(57) ABSTRACT

Embodiments of the present invention disclose a power adjustment method, a terminal, and a storage medium. The method includes: sending, by a terminal, an uplink resource request by using a power of a; if the terminal receives no resource allocation signaling within a predetermined time after the uplink resource request is sent, sending, by the terminal, the uplink resource request again by using a power of b1, wherein b1 is greater than a. Embodiments of the present invention may improve communication efficiency.

19 Claims, 5 Drawing Sheets

(56) References Cited

U.S. PATENT DOCUMENTS

| | | | | |
|---|---|---|---|---|
| 7,212,821 B2* | 5/2007 | Laroia | H04W 36/06 | 455/436 |
| 7,376,425 B2* | 5/2008 | Laroia | H04W 36/18 | 455/437 |
| 7,570,656 B2* | 8/2009 | Raphaeli | H04B 3/542 | 370/445 |
| 7,613,473 B2* | 11/2009 | Yi | H04W 76/18 | 455/518 |
| 7,693,093 B2* | 4/2010 | Riedel | H04W 36/26 | 370/260 |
| 8,081,974 B2* | 12/2011 | Fischer | H04W 74/0833 | 455/435.2 |
| 8,347,298 B2* | 1/2013 | Kawaguchi | H04L 47/70 | 718/104 |
| 8,489,028 B2* | 7/2013 | Bhattad | H04W 72/0406 | 455/63.2 |
| 8,504,091 B2* | 8/2013 | Palanki | H04W 72/0413 | 455/522 |
| 8,554,226 B2* | 10/2013 | Laroia | H04W 36/18 | 455/437 |
| 8,559,966 B2* | 10/2013 | Bernini | H04W 16/04 | 455/452.2 |
| 8,718,667 B2* | 5/2014 | Song | H04W 52/50 | 455/434 |
| 8,744,461 B2* | 6/2014 | Nakatsugawa | H04W 72/04 | 455/450 |
| 8,824,968 B2* | 9/2014 | Kim | H04B 17/327 | 455/442 |
| 9,014,118 B2* | 4/2015 | Proctor, Jr. | H04W 52/50 | 370/329 |
| 9,059,849 B2* | 6/2015 | Li | H04L 1/1896 | |
| 9,084,212 B2* | 7/2015 | Baker | H04W 52/50 | |
| 9,088,952 B2* | 7/2015 | Leizerovich | H04W 52/26 | |
| 9,148,795 B2* | 9/2015 | Das | H04W 24/00 | |
| 9,265,062 B2* | 2/2016 | Ishii | H04W 72/1289 | |
| 9,282,535 B2* | 3/2016 | Zhang | H04W 68/02 | |
| 9,351,244 B2* | 5/2016 | Nordberg | H04W 28/0278 | |
| 9,370,036 B2* | 6/2016 | Yang | H04W 76/18 | |
| 9,485,008 B2* | 11/2016 | Dimou | H04W 72/082 | |
| 9,485,695 B2* | 11/2016 | Laroia | H04W 36/06 | |
| 9,635,652 B2* | 4/2017 | Wu | H04W 52/247 | |
| 9,648,596 B2* | 5/2017 | Palanki | H04W 52/244 | |
| 9,883,461 B2* | 1/2018 | Baker | H04W 52/16 | |
| 9,893,853 B2* | 2/2018 | Yi | H04W 4/70 | |
| 9,930,673 B2* | 3/2018 | Breuer | H04W 72/048 | |
| 9,941,979 B2* | 4/2018 | Gautama | H04R 3/00 | |
| 10,149,316 B2* | 12/2018 | Hogan | H04W 72/0406 | |
| 10,356,733 B2* | 7/2019 | Gupta | H04W 74/0891 | |
| 10,462,825 B2* | 10/2019 | Shailendra | H04W 52/32 | |
| 10,567,986 B2* | 2/2020 | Gupta | H04W 74/0808 | |
| 10,595,311 B2* | 3/2020 | Gupta | H04L 5/0057 | |
| 10,602,549 B2* | 3/2020 | Tsai | H04B 7/088 | |
| 10,606,851 B1* | 3/2020 | Lynch | G06F 9/5027 | |
| 10,693,296 B2* | 6/2020 | Arar | H02J 3/32 | |
| 10,708,938 B2* | 7/2020 | Papasakellariou | H04L 5/0053 | |
| 10,813,137 B2* | 10/2020 | Shih | H04W 74/0833 | |
| 10,869,272 B2* | 12/2020 | Shu | H04W 72/1284 | |
| 10,887,852 B2* | 1/2021 | Gupta | H04W 56/002 | |
| 10,912,042 B2* | 2/2021 | Zeng | H04W 52/367 | |
| 10,917,907 B2* | 2/2021 | Akkarakaran | H04W 74/0833 | |
| 10,932,104 B2* | 2/2021 | Karampatsis | H04L 67/322 | |
| 10,959,270 B2* | 3/2021 | Niu | H04L 5/1469 | |
| 10,986,585 B2* | 4/2021 | Lin | H04B 7/0426 | |
| 11,096,199 B2* | 8/2021 | Papasakellariou | H04L 1/1861 | |
| 11,109,447 B2* | 8/2021 | Niu | H04W 56/001 | |
| 11,116,006 B2* | 9/2021 | Islam | H04W 52/146 | |
| 11,147,104 B2* | 10/2021 | Zhang | H04L 5/005 | |
| 11,166,298 B2* | 11/2021 | Lee | H04W 72/1257 | |
| 11,172,497 B2* | 11/2021 | Papasakellariou | H04W 72/042 | |
| 11,212,689 B2* | 12/2021 | Yang | H04W 24/10 | |
| 2004/0038681 A1* | 2/2004 | Chun | H04L 1/188 | 455/436 |
| 2004/0042492 A1* | 3/2004 | Suzuki | H04L 1/16 | 370/473 |
| 2005/0026597 A1* | 2/2005 | Kim | H04W 48/12 | 455/412.1 |
| 2005/0124344 A1* | 6/2005 | Laroia | H04W 36/18 | 455/436 |
| 2005/0124345 A1* | 6/2005 | Laroia | H04W 36/06 | 455/437 |
| 2006/0063544 A1* | 3/2006 | Zhao | H04W 76/10 | 455/510 |
| 2006/0073836 A1* | 4/2006 | Laroia | H04W 36/18 | 455/450 |
| 2006/0116156 A1* | 6/2006 | Haseba | H04W 36/18 | 455/525 |
| 2006/0133409 A1* | 6/2006 | Prakash | H04W 28/18 | 370/450 |
| 2007/0149228 A1* | 6/2007 | Das | H04W 24/00 | 455/509 |
| 2007/0173256 A1* | 7/2007 | Laroia | H04W 36/06 | 455/436 |
| 2007/0218889 A1* | 9/2007 | Zhang | H04W 74/0866 | 455/422.1 |
| 2007/0297360 A1* | 12/2007 | Joachim | H04W 72/1289 | 370/329 |
| 2008/0031172 A1* | 2/2008 | Nanda | H04W 72/0426 | 370/310.1 |
| 2008/0031222 A1* | 2/2008 | Nanda | H04W 72/02 | 370/350 |
| 2008/0031224 A1* | 2/2008 | Nanda | H04W 72/0426 | 370/350 |
| 2008/0076408 A1* | 3/2008 | Katayama | H04W 52/42 | 455/424 |
| 2008/0082981 A1* | 4/2008 | Kawaguchi | H04L 47/70 | 718/104 |
| 2008/0287130 A1* | 11/2008 | Laroia | H04W 36/18 | 455/436 |
| 2008/0305822 A1* | 12/2008 | Li | H04L 27/2608 | 455/522 |
| 2009/0197631 A1* | 8/2009 | Palanki | H04W 52/244 | 455/522 |
| 2009/0227199 A1* | 9/2009 | Madsen | H04W 48/04 | 455/1 |
| 2009/0291640 A1* | 11/2009 | Bhattad | H04W 72/0413 | 370/329 |
| 2009/0305716 A1* | 12/2009 | Ono | H04W 72/1231 | 455/452.2 |
| 2010/0041428 A1* | 2/2010 | Chen | H04W 52/50 | 455/522 |
| 2010/0069037 A1* | 3/2010 | Fischer | H04W 74/0833 | 455/410 |
| 2010/0195522 A1* | 8/2010 | Lee | H04W 74/0866 | 370/252 |
| 2010/0208628 A1* | 8/2010 | Ishii | H04W 72/1289 | 370/280 |
| 2011/0019604 A1* | 1/2011 | Chun | H04W 72/1257 | 370/312 |
| 2011/0080882 A1* | 4/2011 | Shu | H04W 4/029 | 370/329 |
| 2011/0159802 A1* | 6/2011 | Binti Harum | H04B 7/15528 | 455/7 |
| 2011/0195736 A1* | 8/2011 | Nakatsugawa | H04L 1/0026 | 455/509 |
| 2011/0274040 A1* | 11/2011 | Pani | H04W 74/0833 | 370/328 |
| 2011/0292895 A1* | 12/2011 | Wager | H04W 74/006 | 370/329 |
| 2012/0028672 A1* | 2/2012 | Chen | H04W 52/241 | 455/522 |
| 2012/0063297 A1* | 3/2012 | Hong | H04W 76/18 | 370/216 |
| 2012/0275381 A1* | 11/2012 | Kim | H04W 74/08 | 370/328 |
| 2012/0307700 A1* | 12/2012 | Nordberg | H04W 72/048 | 370/311 |
| 2013/0035084 A1* | 2/2013 | Song | H04W 52/50 | 455/418 |

(56) References Cited

U.S. PATENT DOCUMENTS

| | | | | |
|---|---|---|---|---|
| 2013/0058288 A1* | 3/2013 | Nentwig | H04W 72/082 | 370/329 |
| 2013/0064202 A1* | 3/2013 | Zhang | H04W 68/02 | 370/329 |
| 2013/0142185 A1* | 6/2013 | Leizerovich | H04W 52/346 | 370/338 |
| 2013/0163532 A1* | 6/2013 | Anderson | H04W 72/1278 | 370/329 |
| 2013/0265968 A1* | 10/2013 | Palanki | H04W 52/244 | 370/329 |
| 2014/0029507 A1* | 1/2014 | Dimou | H04W 72/082 | 370/315 |
| 2015/0023281 A1* | 1/2015 | Wu | H04W 72/0473 | 370/329 |
| 2015/0038152 A1* | 2/2015 | Yang | H04W 76/18 | 455/450 |
| 2015/0057011 A1* | 2/2015 | Di Girolamo | H04W 16/14 | 455/454 |
| 2015/0319704 A1* | 11/2015 | Baker | H04W 52/50 | 370/329 |
| 2015/0341937 A1 | 11/2015 | Speight et al. | | |
| 2016/0105905 A1* | 4/2016 | Vajapeyam | H04B 7/0626 | 370/330 |
| 2016/0183203 A1* | 6/2016 | Larsson | H04W 52/241 | 370/329 |
| 2016/0198504 A1* | 7/2016 | Seo | H04W 72/0473 | 370/329 |
| 2016/0242204 A1* | 8/2016 | Hogan | H04W 72/1284 | |
| 2016/0262107 A1* | 9/2016 | Nordberg | H04W 72/048 | |
| 2016/0269128 A1* | 9/2016 | Gautama | H04B 11/00 | |
| 2017/0048882 A1* | 2/2017 | Li | H04L 5/0037 | |
| 2017/0134474 A1* | 5/2017 | Gao | H04L 67/125 | |
| 2017/0164299 A1* | 6/2017 | Shimezawa | H04W 52/30 | |
| 2017/0367052 A1 | 12/2017 | Kil et al. | | |
| 2018/0035427 A1* | 2/2018 | Gupta | H04L 1/1607 | |
| 2018/0049143 A1* | 2/2018 | Gupta | H04W 74/0808 | |
| 2018/0049196 A1* | 2/2018 | Gupta | H04L 5/0048 | |
| 2018/0054837 A1* | 2/2018 | Islam | H04W 74/0833 | |
| 2018/0070252 A1* | 3/2018 | Gupta | H04W 48/16 | |
| 2018/0123744 A1* | 5/2018 | Nogami | H04L 5/0053 | |
| 2018/0124815 A1* | 5/2018 | Papasakellariou | H04W 72/0446 | |
| 2018/0176948 A1* | 6/2018 | Islam | H04L 1/0015 | |
| 2018/0234977 A1* | 8/2018 | Yasukawa | H04W 76/23 | |
| 2018/0255587 A1* | 9/2018 | Shailendra | H04W 52/48 | |
| 2018/0270033 A1* | 9/2018 | Dou | H04W 72/0413 | |
| 2018/0323643 A1* | 11/2018 | Arar | H02J 7/35 | |
| 2018/0332621 A1* | 11/2018 | Eriksson | H04W 74/0833 | |
| 2018/0376422 A1* | 12/2018 | Shu | H04W 52/0235 | |
| 2019/0007892 A1* | 1/2019 | Sheik | H04W 68/00 | |
| 2019/0101620 A1* | 4/2019 | Reis | G01S 3/00 | |
| 2019/0104131 A1* | 4/2019 | Reis | H04L 63/107 | |
| 2019/0141735 A1* | 5/2019 | Akkarakaran | H04W 72/1289 | |
| 2019/0150096 A1 | 5/2019 | Lee et al. | | |
| 2019/0150101 A1* | 5/2019 | Langereis | H04W 52/365 | 455/522 |
| 2019/0261424 A1* | 8/2019 | Park | H04W 72/085 | |
| 2019/0268947 A1* | 8/2019 | Zhang | H04J 11/0073 | |
| 2019/0313222 A1* | 10/2019 | Karampatsis | H04W 76/15 | |
| 2019/0313305 A1* | 10/2019 | Karampatsis | H04W 72/0453 | |
| 2019/0313354 A1* | 10/2019 | Gupta | H04W 16/14 | |
| 2019/0313469 A1* | 10/2019 | Karampatsis | H04W 48/18 | |
| 2019/0313481 A1* | 10/2019 | Niu | H04L 5/0044 | |
| 2019/0349866 A1* | 11/2019 | Lin | H04W 52/146 | |
| 2019/0364449 A1* | 11/2019 | Yang | H04W 72/0446 | |
| 2019/0373036 A1* | 12/2019 | Howard | H04L 65/602 | |
| 2019/0373565 A1* | 12/2019 | Zeng | H04W 52/146 | |
| 2019/0394624 A1* | 12/2019 | Karampatsis | H04W 48/18 | |
| 2019/0394797 A1* | 12/2019 | Ohseki | H04W 72/1263 | |
| 2019/0394806 A1* | 12/2019 | Niu | H04W 72/0446 | |
| 2020/0053730 A1* | 2/2020 | Hosseini | H04L 5/0094 | |
| 2020/0059096 A1* | 2/2020 | Arar | H02J 3/14 | |
| 2020/0081992 A1* | 3/2020 | Lynch | G06F 16/24578 | |
| 2020/0092685 A1* | 3/2020 | Fehrenbach | H04B 7/2606 | |
| 2020/0177341 A1* | 6/2020 | Li | H04L 5/0035 | |
| 2020/0183945 A1* | 6/2020 | Lynch | G06F 9/5027 | |
| 2020/0229235 A1* | 7/2020 | Lu | H04W 74/08 | |
| 2020/0252255 A1* | 8/2020 | Sorrentino | H04B 7/0413 | |
| 2020/0337073 A1* | 10/2020 | Papasakellariou | H04L 1/1861 | |
| 2020/0337074 A1* | 10/2020 | Papasakellariou | H04L 1/1671 | |
| 2020/0351853 A1* | 11/2020 | Xiong | H04L 5/0023 | |
| 2021/0014875 A1* | 1/2021 | Lee | H04W 80/02 | |
| 2021/0092658 A1* | 3/2021 | Karampatsis | H04W 36/04 | |
| 2021/0136794 A1* | 5/2021 | Takeda | H04W 4/00 | |
| 2021/0235390 A1* | 7/2021 | Lin | H04B 7/0426 | |
| 2021/0250913 A1* | 8/2021 | Ganesan | H04W 72/02 | |
| 2021/0274528 A1* | 9/2021 | Papasakellariou | H04L 1/1671 | |
| 2021/0282187 A1* | 9/2021 | Agiwal | H04W 74/008 | |
| 2021/0297175 A1* | 9/2021 | Yu | H04J 11/004 | |
| 2021/0329663 A1* | 10/2021 | Wong | H04W 72/1289 | |
| 2021/0352690 A1* | 11/2021 | Shin | H04L 1/18 | |

OTHER PUBLICATIONS

Extended European Search Report dated Sep. 1, 2021 issued in European Application No. 19834452.5 (13 pages).

Partial Supplementary European Search Report dated May 27, 2021 issued in European Application No. 19834452.5 (14 pages).

International Search Report for PCT/CN2019/095258 dated Oct. 12, 2019 (9 pages).

* cited by examiner

POWER ADJUSTMENT METHOD, TERMINAL, AND STORAGE MEDIUM

CROSS-REFERENCE TO RELATED APPLICATIONS

This application is a national stage of International Application No. PCT/CN2019/095258, filed on Jul. 9, 2019, which claims priority to Chinese Patent Application No. 201811012580.0, filed on Aug. 31, 2018 and Chinese Patent Application No. 201810746733.8, filed on Jul. 9, 2018. All of the aforementioned patent applications are hereby incorporated by reference in their entireties.

TECHNICAL FIELD

Embodiments relate to the field of communications technologies, and in particular, to a power adjustment method, a terminal, and a storage medium.

BACKGROUND

In long term evolution (LTE), when communicating with a base station, a terminal bears corresponding information by sending a signal. Transmission during which a signal is sent by the base station to the terminal is referred to as downlink transmission, and transmission during which a signal is sent by the terminal to the base station is referred to as uplink transmission. When the terminal performs uplink transmission with the base station, a relatively large delay occurs due to reasons such as an uplink bit error rate, or no scheduling for scheduling requests (SR) sent a plurality of times. Consequently, efficiency of communication between the terminal and the base station is reduced.

SUMMARY

Embodiments provide a power adjustment method, a terminal, and a storage medium, to improve communication efficiency.

According to a first aspect, a power adjustment method is disclosed. A terminal sends an uplink resource request by using a power of a; and if no resource allocation signaling is received by the terminal within a predetermined time after the uplink resource request is sent, the terminal sends the uplink resource request again by using a power of b1, where b1 is greater than a. A power for sending the uplink resource request may be increased to increase a possibility that a base station successfully performs decoding, so as to avoid a case in which the base station cannot receive the uplink resource request transmitted a plurality of times due to an insufficient sending power, thereby improving communication efficiency.

In an embodiment, if no resource allocation signaling is received by the terminal within the predetermined time after the terminal sends the uplink resource request by using the power of b1, the terminal sends the uplink resource request again by using a power of b2, where b2 is greater than b1. The sending power can be further increased to further increase a success rate of successful decoding performed by the base station.

In an embodiment, $b2-b1=b1-a=\delta$.

In an embodiment, a difference between b1 and a does not exceed a threshold, and/or a difference between b2 and a does not exceed the threshold. This can ensure that an increase in the sending power does not exceed an upper limit, and can avoid power waste caused by an excessively high power.

In an embodiment, the threshold is a fixed value, and/or a value obtained through calculation based on the power of a. A method for setting the upper limit is given, which can effectively improve power utilization.

In an embodiment, if the terminal receives resource allocation signaling within the predetermined time after the terminal sends the uplink resource request by using the power of b1 or b2, the terminal may adjust a power for the uplink resource request to a. After the uplink resource request is successfully sent, the power may be adjusted back to an original value, so as to avoid power waste on the terminal side caused by continuous increase of the power for the uplink resource request.

In an embodiment, when there is a to-be-sent uplink resource request, and a time difference between a current time and a sending time of a previous uplink resource request is greater than or equal to two periods, the terminal may send the to-be-sent uplink resource request by using the power of a. When there is the to-be-sent uplink resource request, and the time difference between the current time and the sending time of the previous uplink resource request is not less than the two periods, the to-be-sent uplink resource request is sent by using an initial power.

According to a second aspect, a power adjustment method is disclosed. A terminal sends an uplink resource request by using a power of a; if no resource allocation signaling is received by the terminal within a predetermined time after the uplink resource request is sent, the terminal sends the uplink resource request again by using the power of a; and if the terminal sends the uplink resource request n times by using the power of a, and no resource allocation signaling is received by the terminal within the predetermined time after the uplink resource request is sent each of the n times, the terminal sends the uplink resource request again by using a power of b1, where b1 is greater than a, and n is greater than or equal to 2. A power for sending the uplink resource request may be increased to increase a possibility that a base station successfully performs decoding, so as to avoid a case in which the base station cannot receive the uplink resource request transmitted a plurality of times due to an insufficient sending power, thereby improving communication efficiency.

In an embodiment, if the terminal sends the uplink resource request n times by using the power of b1, and no resource allocation signaling is received by the terminal within the predetermined time after the uplink resource request is sent each of the n times, the terminal sends the uplink resource request again by using a power of b2, where b2 is greater than b1. The sending power can be further increased to further increase a success rate of successful decoding performed by the base station.

In an embodiment, $b2-b1=b1-a=\delta$.

In an embodiment, a difference between b1 and a does not exceed a threshold, and/or a difference between b2 and a does not exceed the threshold. This can ensure that an increase in the sending power does not exceed an upper limit, and can avoid power waste caused by an excessively high power.

In an embodiment, the threshold is a fixed value, and/or a value obtained through calculation based on the power of a. A method for setting the upper limit is given, which can effectively improve power utilization.

In an embodiment, if the terminal receives resource allocation signaling within the predetermined time after the terminal sends the uplink resource request by using the power of b1 or b2, the terminal may adjust a power for the uplink resource request to a. After the uplink resource request is successfully sent, the power may be adjusted back to an original value, so as to avoid power waste on the terminal side caused by continuous increase of the power for the uplink resource request.

In an embodiment, when there is a to-be-sent uplink resource request, and a time difference between a current time and a sending time of a previous uplink resource request is greater than or equal to two periods, the terminal may send the to-be-sent uplink resource request by using the power of a. When there is the to-be-sent uplink resource request, and the time difference between the current time and the sending time of the previous uplink resource request is not less than the two periods, the to-be-sent uplink resource request is sent by using an initial power.

According to a third aspect, a power adjustment method is disclosed. A terminal sends uplink data to a base station by using a power of a; receives response information from the base station; and when the response information is information used to indicate that the uplink data is not successfully decoded, sends the uplink data to the base station again by using a power of b1, where b1 is greater than a. A power for sending the uplink data may be increased to increase a possibility that the base station successfully performs decoding, so as to avoid a case in which the base station cannot receive the uplink data transmitted a plurality of times due to an insufficient sending power, thereby improving communication efficiency.

In an embodiment, when the response information is the information used to indicate that the uplink data is not successfully decoded, the terminal determines a to-be-adjusted value; and when the to-be-adjusted value is less than or equal to a first threshold, sends the uplink data to the base station again by using the power of b1. This can ensure that an increase in the sending power does not exceed the first threshold, and can avoid power waste caused by an excessively high power. The to-be-adjusted value is equal to a sum of a previous adjustment value and a power increment, the power increment is a power increase used each time the terminal increases the sending power, and the previous adjustment value is a difference between a previous sending power and an initial power.

In an embodiment, when the to-be-adjusted value is greater than the first threshold, the terminal sends the uplink data to the base station again by using the power of a. This can ensure that the increase in the sending power does not exceed the first threshold, and can avoid power waste caused by an excessively high power.

In an embodiment, when the response information is information used to indicate that the uplink data is successfully decoded, the terminal adjusts a power for sending the uplink data to the base station to c, where c is less than a. After the uplink data is successfully sent, the power may be decreased, so as to avoid power waste on the terminal side.

In an embodiment, when the response information is the information used to indicate that the uplink data is successfully decoded, the terminal counts a quantity of times the response information is the information used to indicate that the uplink data is successfully decoded; and when the quantity of times is equal to a preset quantity of times, resets the counted quantity of times to zero, and then adjusts the power for sending the uplink data to the base station to c. This can avoid frequent adjustment of the power for sending the uplink data.

In an embodiment, when a sum of a previous adjustment value and a power increment is less than or equal to a first threshold, the terminal counts a quantity of times the response information is the information used to indicate that the uplink data is successfully decoded, or adjusts the power for sending the uplink data to the base station to c.

In an embodiment, when the response information is the information used to indicate that the uplink data is successfully decoded, the terminal obtains a path loss value, and adjusts the power for sending the uplink data to the base station to c only when the path loss value is less than or equal to a second threshold. This can ensure that after the power for sending the uplink data is decreased, the possibility that the base station successfully performs decoding is not decreased due to the path loss value.

In an embodiment, the terminal determines a to-be-adjusted value, and when the to-be-adjusted value is greater than or equal to a third threshold, adjusts the power for sending the uplink data to the base station to c. This can ensure that a decrease in the sending power is not less than the third threshold, so that a power can be saved. The to-be-adjusted value is equal to a difference between a previous adjustment value and a power decrement, and the power decrement is a power decrease used each time the terminal decreases the sending power.

In an embodiment, when the sum is greater than the first threshold, the path loss value is greater than the second threshold, or the to-be-adjusted value is less than the third threshold, the terminal keeps the power for sending the uplink data to the base station unchanged. This can avoid the frequent adjustment of the power for sending the uplink data.

According to a fourth aspect, a power adjustment method is disclosed. A terminal receives downlink data from a base station; when the downlink data is successfully decoded, sends, to the base station by using a power of a, response information used to indicate that the downlink data is successfully decoded; and when the downlink data retransmitted from the base station is received within a predetermined time after the response information is sent, sends the response information to the base station again by using a power of b1, where b1 is greater than a. A power for sending the response information may be increased to increase a possibility that the base station successfully receives the response information, so as to avoid a case in which the downlink data is retransmitted a plurality of times due to an insufficient sending power, thereby improving communication efficiency.

In an embodiment, when the downlink data retransmitted from the base station is received within the predetermined time after the response information is sent, the terminal sends the response information to the base station again by using the power of a; and only when the terminal sends the response information a preset quantity of times by using the power of a and receives, within the predetermined time after the response information is sent each of the preset quantity of times, the downlink data retransmitted from the base station, sends the response information to the base station again by using the power of b1. This can avoid frequent adjustment of the power for sending the uplink data.

In an embodiment, the terminal determines a to-be-adjusted value; and when the to-be-adjusted value is less than or equal to a first threshold, sends the response information to the base station again by using the power of b1. This can ensure that an increase in the sending power does not exceed the first threshold, so as to avoid power waste caused by an excessively high power. The to-be-adjusted value is equal to a sum of a previous adjustment value and a power increment, the power increment is a power increase used each time the terminal increases the sending power, and the previous adjustment value is a difference between a previous sending power and an initial power.

In an embodiment, when the to-be-adjusted value is greater than the first threshold, the terminal sends the response information to the base station again by using the power of a. When the increase in the sending power exceeds the first threshold, the sending power is not adjusted, so as to avoid power waste caused by an excessively high power.

In an embodiment, when the downlink data retransmitted from the base station is not received within the predetermined time after the response information is sent, the terminal counts a quantity of times the downlink data is not retransmitted; and when the quantity of times is equal to the preset quantity of times, resets the counted quantity of times to zero, and adjusts a power for sending the response information to the base station to c, where c is less than a. After a quantity of times the base station successfully receives the response information is the preset quantity of times, the power may be decreased, so as to avoid power waste on the terminal side.

In an embodiment, only when a sum of a previous adjustment value and a power increment is less than or equal to the first threshold, the terminal counts the quantity of times the downlink data is not retransmitted.

In an embodiment, the terminal determines a to-be-adjusted value; when the downlink data retransmitted from the base station is not received within the predetermined time after the response information is sent, or the to-be-adjusted value is less than a second threshold, or the sum is greater than the first threshold, keeps the power for sending the response information to the base station unchanged; and when the to-be-adjusted value is greater than or equal to the second threshold, the terminal adjusts the power for sending the response information to the base station to c. This can avoid the frequent adjustment of the power for sending the response information, and can also ensure that a decrease in the sending power is not less than a third threshold, so that a power can be saved. The to-be-adjusted value is equal to a difference between a previous adjustment value and a power decrement, and the power decrement is a power decrease used each time the terminal decreases the sending power.

In an embodiment, when the downlink data retransmitted from the base station is not received within the predetermined time after the response information is sent to the base station by using the power of b1, the terminal adjusts, to a, the power for sending the response information to the base station. After the response information is successfully sent, the power may be adjusted back to an original value, so as to avoid power waste on the terminal side caused by continuous increase of the power for the response information.

According to a fifth aspect, a terminal is disclosed. The terminal includes units configured to perform the power adjustment method disclosed in any one of the first aspect or the embodiments of the first aspect, or units configured to perform the power adjustment method disclosed in any one of the second aspect or the embodiments of the second aspect, units configured to perform the power adjustment method disclosed in any one of the third aspect or the embodiments of the third aspect, or units configured to perform the power adjustment method disclosed in any one of the fourth aspect or the embodiments of the fourth aspect.

According to a sixth aspect, a terminal is disclosed. The terminal includes a processor and a memory, where the memory is configured to store an instruction, and the processor is configured to invoke the instruction stored in the memory, to perform the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

According to a seventh aspect, a terminal is disclosed. The terminal includes a processor, a memory, and a transceiver. The transceiver is configured to receive and send data, the memory is configured to store program code, and the processor is configured to execute the program code. When the processor executes the program code stored in the memory, the processor is enabled to perform the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

According to an eighth aspect, a computer program product is disclosed, including a computer program, where when the computer program is executed on a computer, the computer is enabled to implement the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

According to a ninth aspect, a computer program is disclosed, where when the computer program is executed on a computer, the computer is enabled to implement the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

According to a tenth aspect, a storage medium is disclosed, which stores a computer program, where when the computer program is executed on a computer, the computer is enabled to implement the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

According to an eleventh aspect, an apparatus is disclosed, including a processing module and a communication interface, where the processing module is configured to perform the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

In an embodiment, the apparatus further includes a storage module (for example, a memory), where the storage module is configured to store an instruction, the processing module is configured to execute the instruction stored in the storage module, and execution of the instruction stored in the storage module enables the processing module to perform the power adjustment method disclosed in any one of the first aspect or the embodiments of the first aspect, the power adjustment method disclosed in any one of the second aspect or the embodiments of the second aspect, the power adjustment method disclosed in any one of the third aspect or the embodiments of the third aspect, or the power adjustment method disclosed in any one of the fourth aspect or the embodiments of the fourth aspect.

According to a twelfth aspect, a communications apparatus is disclosed. The apparatus has a function of implementing the power adjustment method disclosed in the foregoing embodiments. The function may be implemented by using hardware, or may be implemented by hardware executing corresponding software. The hardware or the software includes one or more units corresponding to the foregoing function. In a possible embodiment, the apparatus may be a terminal in this specification. In this case, the apparatus has a function of implementing the power adjustment method provided in any one of the foregoing embodiments. Further, the apparatus may exist in the terminal in this specification in a product form of a chip, to control the terminal to implement the power adjustment method provided in any one of the foregoing embodiments.

According to a thirteenth aspect, a communications apparatus is disclosed. The apparatus includes a memory and a processor, where the memory is configured to store a computer executable instruction. The processor is connected to the memory by using a communications bus, and the processor executes the computer executable instruction stored in the memory, so that the apparatus implements any method provided in any one of the foregoing embodiments. In a possible embodiment, the apparatus may be a terminal in this specification. In this case, the apparatus has a function of implementing the power adjustment method provided in any one of the foregoing embodiments. Further, the apparatus may exist in the terminal in this specification in a product form of a chip, to control the terminal to implement the power adjustment method provided in any one of the foregoing embodiments.

DESCRIPTION OF EMBODIMENTS

Embodiments of the present invention disclose a power adjustment method, a terminal, and a storage medium, to improve communication efficiency. Details are described below separately.

Figure 1:
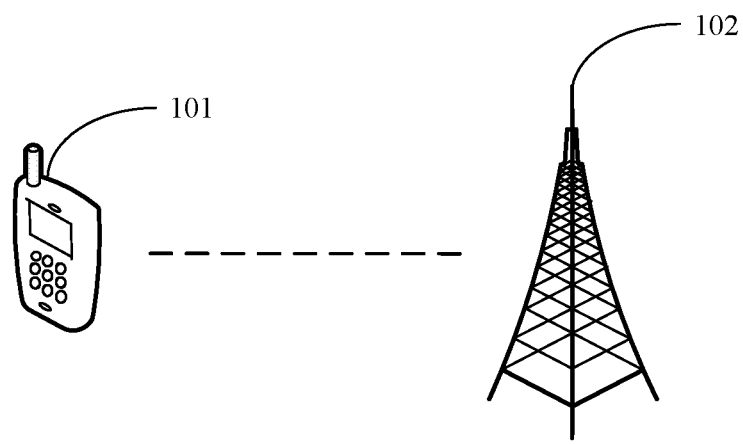
FIG. 1 is a schematic diagram of a network architecture according to an embodiment of the present invention.

To better understand a power adjustment method, a terminal, and a storage medium in various embodiments in accordance with the present invention, a network architecture that can be used in various embodiments is first described below. FIG. 1 is a schematic diagram of a network architecture according to an embodiment of the present invention. As shown in FIG. 1, the network architecture may include a terminal 101 and a base station 102. The terminal 101 is connected to the base station 102 by using a wireless network. Transmission during which a signal is sent by the terminal 101 to the base station 102 is referred to as uplink transmission, and transmission during which a signal is sent by the base station 102 to the terminal 102 is referred to as downlink transmission. The uplink transmission mainly includes two types of signal transmission. One type is signal transmission on an uplink control channel (PUCCH), and bears uplink control signaling. The other type is signal transmission on an uplink shared channel (PUSCH), and bears uplink data and/or uplink control signaling that mainly includes control-related information, for example, replying with an acknowledgment/negative acknowledgment (ACK/NACK), transmitting uplink channel state information (CSI), or bearing a scheduling request. For example, the base station sends a data packet to the terminal. After the terminal successfully decodes the data packet, the terminal notifies, by using the PUCCH, the base station that the data packet is successfully sent. The uplink data mainly includes some data packets. For example, when a video is uploaded or a WeChat message is sent, corresponding information is packed into a data packet, and the data packet is sent to the base station by using the PUSCH.

Figure 2:
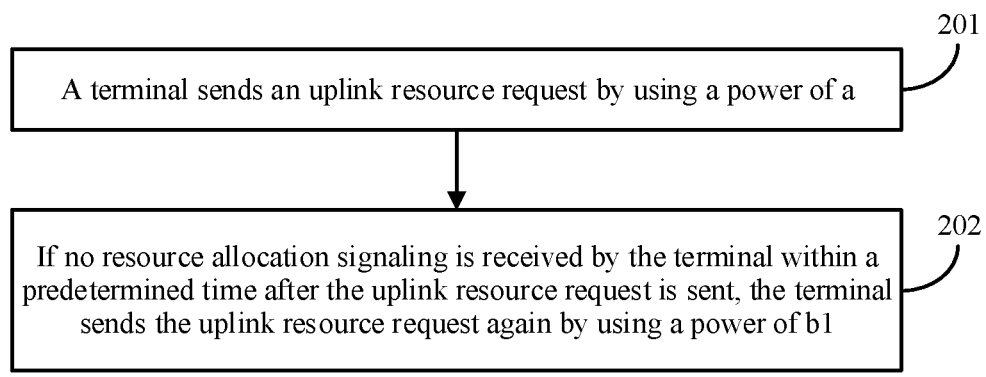
FIG. 2 is a schematic flowchart of a power adjustment method according to an embodiment of the present invention.

Based on the network architecture shown in FIG. 1, FIG. 2 is a schematic flowchart of a power adjustment method according to one embodiment. As shown in FIG. 2, the power adjustment method may include the following steps.

201. A terminal sends an uplink resource request by using a power of a.

In this embodiment, a sending power at which the terminal sends an uplink resource request by using a PUCCH may be calculated by using the following formula:

$$P_{PUCCH}(i) = \min\begin{cases} P_{CMAX,c}(i) \\ P_{0\_PUCCH} + PL_c + h(n_{CQI}, n_{HARQ}, n_{SR}) + \\ \Delta_{F\_PUCCH}(F) + \Delta_{TxD}(F') + g(i) + [g'(i)] \end{cases} \quad (1)$$

where $P_{CMAX,c}(i)$ represents a maximum sending power of the terminal, $P_{0\_PUCCH}$ represents a power adjustment parametric value, $PL_c$ represents a path loss value, $h(n_{CQI}, n_{HARQ}, n_{SR})$ represents a power adjustment parametric value introduced based on a type of signaling borne on the PUCCH $\Delta_{F\_PUCCH}(F)$ represents a power adjustment parametric value introduced based on a type of the PUCCH, $\Delta_{TxD}(F^i)$ represents a power adjustment parametric value introduced for the PUCCH based on a timeslot or a subframe, $g(i)$ represents an adjustment parametric value indicated by a base station, and $[g^i(i)]$ represents an adjustment value of a power, may be $g^i(i)$, or a value obtained after rounding down $g^i(i)$, or a value obtained after rounding up $g^i(i)$, and is used as an additional parametric value for uplink power adjustment of the PUCCH. In actual implementation, a required value of $g^i(i)$ may be obtained by using several parameters such as $h(n_{CQI}, n_{HARQ}, n_{SR})$ or $\Delta_{TxD}(F^i)$ without introducing.

In this embodiment, when the terminal needs to send an uplink resource request to a base station for the first time, initialization is performed, in other words, $[g^i(i)]$ is set to zero. In this case, the corresponding sending power is an initial power. In this embodiment, the initial power is set to a, and the uplink resource request is sent to the base station by using the power of a.

202. If no resource allocation signaling is received by the terminal within a predetermined time after the uplink resource request is sent, the terminal sends the uplink resource request again by using a power of b1.

In this embodiment, when resource allocation signaling for the uplink resource request is not received within the predetermined time after the uplink resource request is sent by using the power of a, the uplink resource request may be sent again by using the power of b1, where b1 is greater than a. For example, the terminal increases the sending power and applies for a resource again when failing to obtain a resource from the base station through application. When the resource allocation signaling for the uplink resource request is received within the predetermined time after the uplink resource request is sent by using the power of a, the terminal may keep the power of a for sending the uplink resource request unchanged.

In this embodiment, when the resource allocation signaling for the uplink resource request is not received within the predetermined time after the uplink resource request is sent by using the power of a, alternatively, it may be first determined whether a to-be-adjusted value is less than or equal to a threshold; and when the to-be-adjusted value is less than or equal to the threshold, the uplink resource request is sent again by using the power of b1, and when the to-be-adjusted value is greater than the threshold, the uplink resource request is sent again by using the power of a. The to-be-adjusted value is equal to a sum of a previous adjustment value and a power increment, the power increment is a power increase used each time the terminal increases the sending power, and the previous adjustment value is a difference between a previous sending power and the initial power. Because the power of a is the initial power, the previous adjustment value is 0, and the to-be-adjusted value is equal to the power increment.

In this embodiment, the threshold may be a fixed value, or may be a value obtained through calculation based on the power of a, or may be a value obtained through calculation based on the fixed value and the initial power. When the threshold is a value obtained through calculation based on the initial power, the threshold may be a difference that is between $P_{CmAX,c}(i)$ and $P_{PUCCH}(i)$ and that is used when $[g^i(i)]$ is equal to 0, or may be a difference that is between $P_{CmAX,c}(i)$ and a value obtained after rounding up or rounding down $P_{PUCCH}(i)$ and that is used when $[g^i(i)]$ is equal to 0. Alternatively, a mapping relationship may be set, when $[g^i(i)]$ is equal to 0, to $P_{PUCCH}(i)$, the value obtained after rounding up $P_{PUCCH}(i)$, or the value obtained after rounding down $P_{PUCCH}(i)$. For example, when $P_{PUCCH}(i)$ is 0 dB to 5 dB, the threshold may be 5 dB; when $P_{PUCCH}(i)$ is 5 dB to 10 dB, the threshold may be 4 dB; when $P_{PUCCH}(i)$ is 10 dB to 15 dB, the threshold may be 3 dB; when $P_{PUCCH}(i)$ is 15 dB to 20 dB, the threshold may be 2 dB; and when $P_{PUCCH}(i)$ is 20 dB to 22 dB, the threshold may be 1 dB.

In this embodiment, when the terminal does not receive the resource allocation signaling for the uplink resource request within the predetermined time after the uplink resource request is sent by using the power of b1, the terminal may send the uplink resource request again by using a power of b2, where b2 is greater than b1. For example, the terminal increases the sending power again and applies for a resource again when the terminal still fails to obtain a resource from the base station through application by using the power of b1. When the resource allocation signaling for the uplink resource request is received within the predetermined time after the uplink resource request is sent by using the power of b1, the terminal may keep the power of b1 for sending the uplink resource request unchanged, or may decrease the power for sending the uplink resource request. However, a value of the decreased sending power needs to be greater than or equal to the initial power of a.

In this embodiment, when the resource allocation signaling for the uplink resource request is not received within the predetermined time after the uplink resource request is sent by using the power of b1, alternatively, it may be first determined whether a to-be-adjusted value is less than or equal to a threshold; and when the to-be-adjusted value is less than or equal to the threshold, the uplink resource request may be sent again by using the power of b2, and when the to-be-adjusted value is greater than the threshold, the uplink resource request may be sent again by using the power of b1. The to-be-adjusted value is a sum of a previous adjustment value b1−a and a power increment.

In this embodiment, the power increment is b2−b1=b1−a=δ. In other words, values of powers increased in all times are equal. A difference between b1 and a does not exceed the threshold, and a difference between b2 and a does not exceed the threshold. In other words, the difference between the sending power and the initial power cannot exceed the threshold at any time, and consequently, power waste is caused by a relatively large sending power. When the adjusted sending power is b1, the adjustment value is equal to b1−a=δ, and when the adjusted sending power is b2, the adjustment value is equal to b2−a=2δ.

In an embodiment, when the terminal receives the resource allocation signaling for the uplink resource request within the predetermined time after the terminal sends the uplink resource request by using the power of b1 or b2, the terminal may adjust a power for the uplink resource request to a, in other words, $[g^i(i)]$ is set to zero, which means that the sending power is adjusted to the initial power.

In an embodiment, when there is a to-be-sent uplink resource request, and a time difference between a current time and a sending time of a previous uplink resource request sent to the base station is greater than or equal to two periods, the terminal may send the to-be-sent uplink resource request by using the power of a. In other words, when there is the to-be-sent uplink resource request, and a time period from a time at which the uplink resource request is sent last time is not less than two periods, the to-be-sent uplink resource request is sent by using the initial power regardless of a value of a previous sending power. The previous uplink resource request and the to-be-sent uplink resource request are different uplink resource requests.

Figure 3:
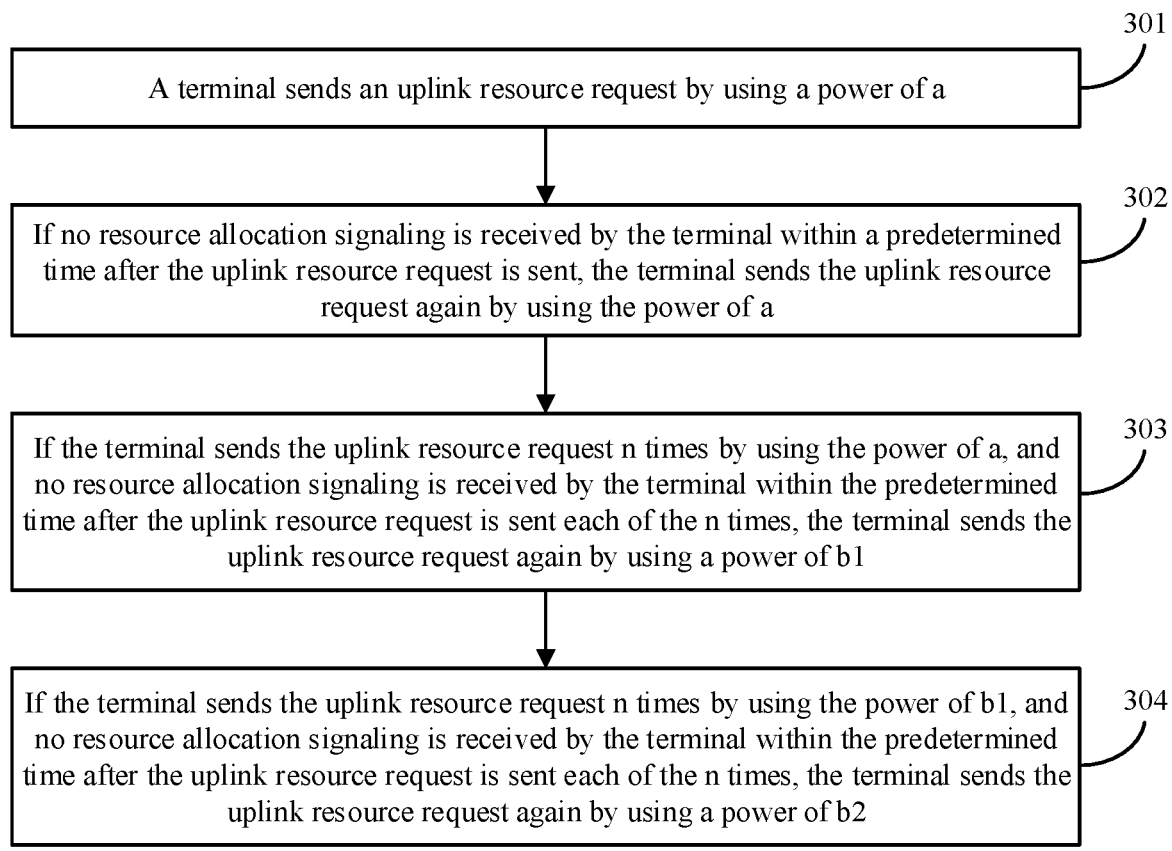
FIG. 3 is a schematic flowchart of another power adjustment method according to an embodiment of the present invention.

Based on the network architecture shown in FIG. 1, FIG. 3 is a schematic flowchart of another power adjustment method according to an embodiment of the present invention. As shown in FIG. 3, the power adjustment method may include the following steps.

301. A terminal sends an uplink resource request by using a power of a.

Step 301 is the same as step 201. For detailed descriptions, refer to step 201. Details are not described herein again.

302. If no resource allocation signaling is received by the terminal within a predetermined time after the uplink resource request is sent, the terminal sends the uplink resource request again by using the power of a.

In this embodiment, if the terminal does not receive the resource allocation signaling for the uplink resource request within the predetermined time after the uplink resource request is sent by using the power of a, the terminal may count a quantity of times the uplink resource request is sent by using a same power, and then send the uplink resource request again by using the power of a.

303. If the terminal sends the uplink resource request n times by using the power of a, and no resource allocation signaling is received by the terminal within the predetermined time after the uplink resource request is sent each of the n times, the terminal sends the uplink resource request again by using a power of b1.

In this embodiment, when the terminal sends the uplink resource request n consecutive times by using the power of a, and does not receive resource allocation signaling for the uplink resource request, the counted quantity of times the uplink resource request is sent by using the same power may be reset to zero, and the uplink resource request is sent again by using the power of b1, where b1 is greater than a. To be specific, the terminal increases the sending power and applies for a resource again only when failing to obtain a resource from a base station n consecutive times through application by using the same sending power. When the resource allocation signaling for the uplink resource request is received within the predetermined time after any time the uplink resource request is sent by the terminal by using the power of a, the terminal may keep the power of a for sending the uplink resource request unchanged. n is an integer greater than or equal to 2, and is a preset value.

In this embodiment, when the terminal sends the uplink resource request n consecutive times by using the power of a, and does not receive the resource allocation signaling for the uplink resource request, alternatively, the counted quantity of times the uplink resource request is sent by using the same power may be reset to zero, and it may be first determined whether a to-be-adjusted value is less than or equal to a threshold. When the to-be-adjusted value is less than or equal to the threshold, the uplink resource request is sent again by using the power of b1. When the to-be-adjusted value is greater than the threshold, the uplink resource request is sent again by using the power of a. The to-be-adjusted value is equal to a sum of a previous adjustment value and a power increment, the power increment is a power increase used each time the terminal increases the sending power, and the previous adjustment value is a difference between a previous sending power and an initial power. Because the power of a is the initial power, the previous adjustment value is 0, and the to-be-adjusted value is equal to the power increment.

304. If the terminal sends the uplink resource request n times by using the power of b1, and no resource allocation signaling is received by the terminal within the predetermined time after the uplink resource request is sent each of the n times, the terminal sends the uplink resource request again by using a power of b2.

In this embodiment, when the terminal sends the uplink resource request n consecutive times by using the power of b1, and does not receive the resource allocation signaling for the uplink resource request, the counted quantity of times the uplink resource request is sent by using the same power may be reset to zero, and the uplink resource request is sent again by using the power of b2, where b2 is greater than b1. To be specific, the terminal increases the sending power again and applies for a resource again when still failing to obtain a resource from the base station n consecutive times through application by using an increased power. When the resource allocation signaling for the uplink resource request is received within the predetermined time after any time the uplink resource request is sent by using the power of b1, the terminal may keep the power of b1 for sending the uplink resource request unchanged, or may decrease the power for sending the uplink resource request. However, a value of the decreased sending power needs to be greater than or equal to the initial power of a.

In this embodiment, when the terminal sends the uplink resource request n consecutive times by using the power of b1, and does not receive the resource allocation signaling for the uplink resource request, alternatively, the counted quantity of times the uplink resource request is sent by using the same power may be reset to zero, and it may be first determined whether a to-be-adjusted value is less than or equal to a threshold. When the to-be-adjusted value is less than or equal to the threshold, the uplink resource request is sent again by using the power of b2. When the to-be-adjusted value is greater than the threshold, the uplink resource request is sent again by using the power of b1. The to-be-adjusted value is a sum of a previous adjustment value (a difference between b1 and a) and a power increment.

In an embodiment, when the terminal receives the resource allocation signaling within the predetermined time after the terminal sends the uplink resource request by using the power of b1 or b2, the terminal may adjust a power for the uplink resource request to a, in other words, $[g^j(i)]$ is set to zero, which means that the sending power is adjusted to the initial power.

In an embodiment, when there is a to-be-sent uplink resource request, and a time difference between a current time and a sending time of a previous uplink resource request sent to the base station is greater than or equal to two periods, the terminal may send the to-be-sent uplink resource request by using the power of a. In other words, when there is the to-be-sent uplink resource request, and a time period from a time at which the uplink resource request is sent last time is not less than two periods, the to-be-sent uplink resource request is sent by using the initial power regardless of a value of a previous sending power. The previous uplink resource request and the to-be-sent uplink resource request are different uplink resource requests.

Figure 4:
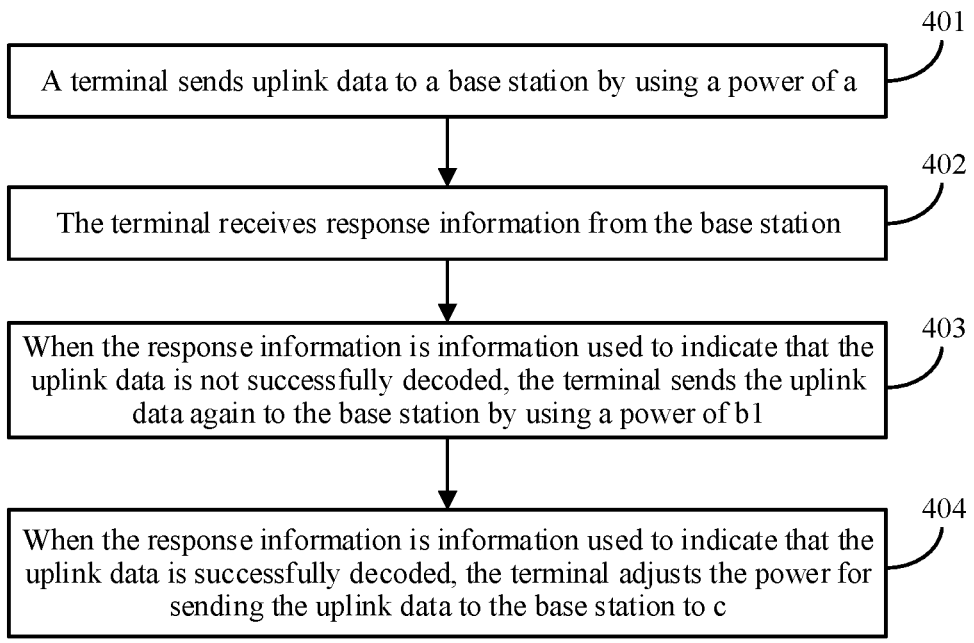
FIG. 4 is a schematic flowchart of still another power adjustment method according to an embodiment of the present invention.

Based on the network architecture shown in FIG. 1, FIG. 4 is a schematic flowchart of still another power adjustment method according to an embodiment of the present invention. As shown in FIG. 4, the power adjustment method may include the following steps.

401. A terminal sends uplink data to a base station by using a power of a.

In this embodiment, a sending power at which the terminal sends uplink data by using a PUSCH may be calculated by using the following formula:

$$P_{PUSCH}(i) = \min \begin{cases} P_{CMAX,c}(i) \\ 10\log_{10}(M_{PUSCH}(i)) + P_{0\_PUSCH}(i) + \alpha_c(i)gPL_c + \Delta_{TF}(i)f(i) + [f'(i)] \end{cases} \quad (2)$$

where $P_{CMAX,c}(i)$ represents a maximum sending power of the terminal, $M_{PUSCH}(i)$ represents a resource block (Resource Block, RB), $P_{0\_PUSCH}$ represents a power adjustment parametric value, $PL_c$ represents a path loss value, $\alpha_c(i)$ represents a path loss coefficient, $\Delta_{TF}(i)$ represents a power adjustment parametric value caused by different adjustment, $f(i)$ represents an adjustment parametric value indicated by the base station, $[f'(i)]$ represents an adjustment value of a power, may be $f'(i)$, or a value obtained after rounding down $f'(i)$, or a value obtained after rounding up $f'(i)$, and is used as an additional parametric value for uplink power adjustment of the PUSCH. In actual implementation, a required value of $f'(i)$ may be obtained by using several parameters such as $\alpha_c(i)$ or $\Delta_{TF}(i)$ without introducing $f'(i)$.

In this embodiment, when the terminal needs to send uplink data to a base station for the first time, initialization is performed, in other words, $[f'(i)]$ is set to zero. In this case, the corresponding sending power is an initial power. When uplink data needs to be sent to the base station, the power of a may be used to send the uplink data to the base station. The power of a may be the initial power or a non-initial power.

402. The terminal receives response information from the base station.

In this embodiment, after the terminal sends the uplink data by using the PUSCH, if the uplink data is successfully decoded by the base station, the base station sends an ACK to the terminal, and if the uplink data fails to be decoded by the base station, the base station sends a NACK to the terminal. The terminal detects an ACK or NACK indication sent by the base station by using a physical hybrid automatic repeat request (HARQ) indicator channel (PHICH). The terminal decodes the ACK or NACK indication to obtain an ACK or a NACK. Therefore, after the terminal sends the uplink data to the base station by using the power of a, the terminal receives the response information for the uplink data from the base station. The response information may be an ACK or a NACK.

403. When the response information is information used to indicate that the uplink data is not successfully decoded, the terminal sends the uplink data to the base station again by using a power of b1.

In this embodiment, when the response information is the information used to indicate that the uplink data is not successfully decoded, in other words, the response information is a NACK, the terminal may send the uplink data to the base station again by using the power of b1, where b1 is greater than a. In other words, when the uplink data sent by the terminal is not successfully decoded by the base station, the terminal increases the sending power, and sends the uplink data again.

In this embodiment, when the response information from the base station is received within a predetermined time after any time the uplink data is sent by using the power of a, and the response information is the information used to indicate that the uplink data is not successfully decoded, alternatively, the terminal may first count a quantity of times the uplink data is sent by using a same power, and determine whether the quantity of times is equal to a threshold; when the quantity of times is equal to the threshold, reset, to zero, the counted quantity of times the uplink data is sent by using the same power, and send the uplink data to the base station again by using the power of b1; and when the quantity of times is not equal to the threshold, send the uplink data to the base station again by using the power of a.

In this embodiment, when the response information is the information used to indicate that the uplink data is not successfully decoded, or the quantity of times is equal to the threshold, alternatively, the terminal may first determine a to-be-adjusted value, and send the uplink data to the base station again by using the power of b1 only when the to-be-adjusted value is less than or equal to a first threshold, where a difference between b1 and the initial power is equal to the to-be-adjusted value. When the to-be-adjusted value is greater than the first threshold, the terminal sends the uplink data to the base station again by using the power of a without increasing the sending power, so that waste of the sending power can be avoided. The to-be-adjusted value is equal to a sum of a previous adjustment value and a power increment, the power increment is a power increase used each time the terminal increases the sending power, and the previous adjustment value is a difference between a previous sending power and the initial power. When the power of a is the initial power, the to-be-adjusted value is the power increment. When the power of a is not the initial power, the to-be-adjusted value is a sum of the power increment and a difference between a and the initial power. The determining and sending of the first threshold are the same as the determining and sending of the threshold in the foregoing embodiments. Details are not described herein again.

404. When the response information is information used to indicate that the uplink data is successfully decoded, the terminal adjusts the power for sending the uplink data to the base station to c.

In this embodiment, when the response information is the information used to indicate that the uplink data is successfully decoded, in other words, the response information is an ACK, the terminal may adjust the power for sending the uplink data to the base station to c, where c is less than a. In other words, when the uplink data sent by the terminal is successfully decoded by the base station, the terminal may decrease the sending power. When the power of a is the initial power, and the response information is the information used to indicate that the uplink data is successfully decoded, the terminal keeps the power of a unchanged. When the power of a is not the initial power, and the response information is the information used to indicate that the uplink data is successfully decoded, the power for sending the uplink data to the base station may be adjusted to c, where c needs to be greater than or equal to the initial power.

In this embodiment, when the response information is the information used to indicate that the uplink data is successfully decoded, the terminal may first count a quantity of times the response information is the information used to indicate that the uplink data is successfully decoded; when the quantity of times is equal to the preset quantity of times, reset the counted quantity of times to zero, and adjust the power for sending the uplink data to the base station to c; and when the quantity of times is not equal to the preset quantity of times, keep the power of a for sending the uplink data to the base station unchanged.

In this embodiment, when the response information is the information used to indicate that the uplink data is successfully decoded, the sum of the previous adjustment value and the power increment may be first obtained. Only when the sum of the previous adjustment value and the power increment is less than or equal to the first threshold, the terminal counts a quantity of times the response information is the information used to indicate that the uplink data is successfully decoded, or adjusts the power for sending the uplink data to the base station to c.

In this embodiment, when the response information is the information used to indicate that the uplink data is successfully decoded, the terminal may first obtain a path loss value, and adjust the power for sending the uplink data to the base station to c only when the path loss value is less than or equal to a second threshold; and when the path loss value is greater than the second threshold, keep the power for sending the uplink data to the base station unchanged.

In this embodiment, when the response information is the information used to indicate that the uplink data is successfully decoded, or the path loss value is less than or equal to the second threshold, or the quantity of times is equal to the preset quantity of times, or the sum of the previous adjustment value and the power increment is less than or equal to the first threshold, the terminal may first determine a to-be-adjusted value, and adjust the power for sending the uplink data to the base station to c only when the to-be-adjusted value is greater than or equal to a third threshold; and when the to-be-adjusted value is less than the third threshold, or the sum of the previous adjustment value and the power increment is greater than the first threshold, may keep the power for sending the uplink data to the base station unchanged. The to-be-adjusted value is equal to a difference between a previous adjustment value and a power decrement, and the power decrement is a power decrease used each time the terminal decreases the sending power. The to-be-adjusted value is the difference between the previous adjustment value (a difference between a and the initial power) and the power decrement. The power increment and the power decrement may be the same or may be different.

Figure 5:
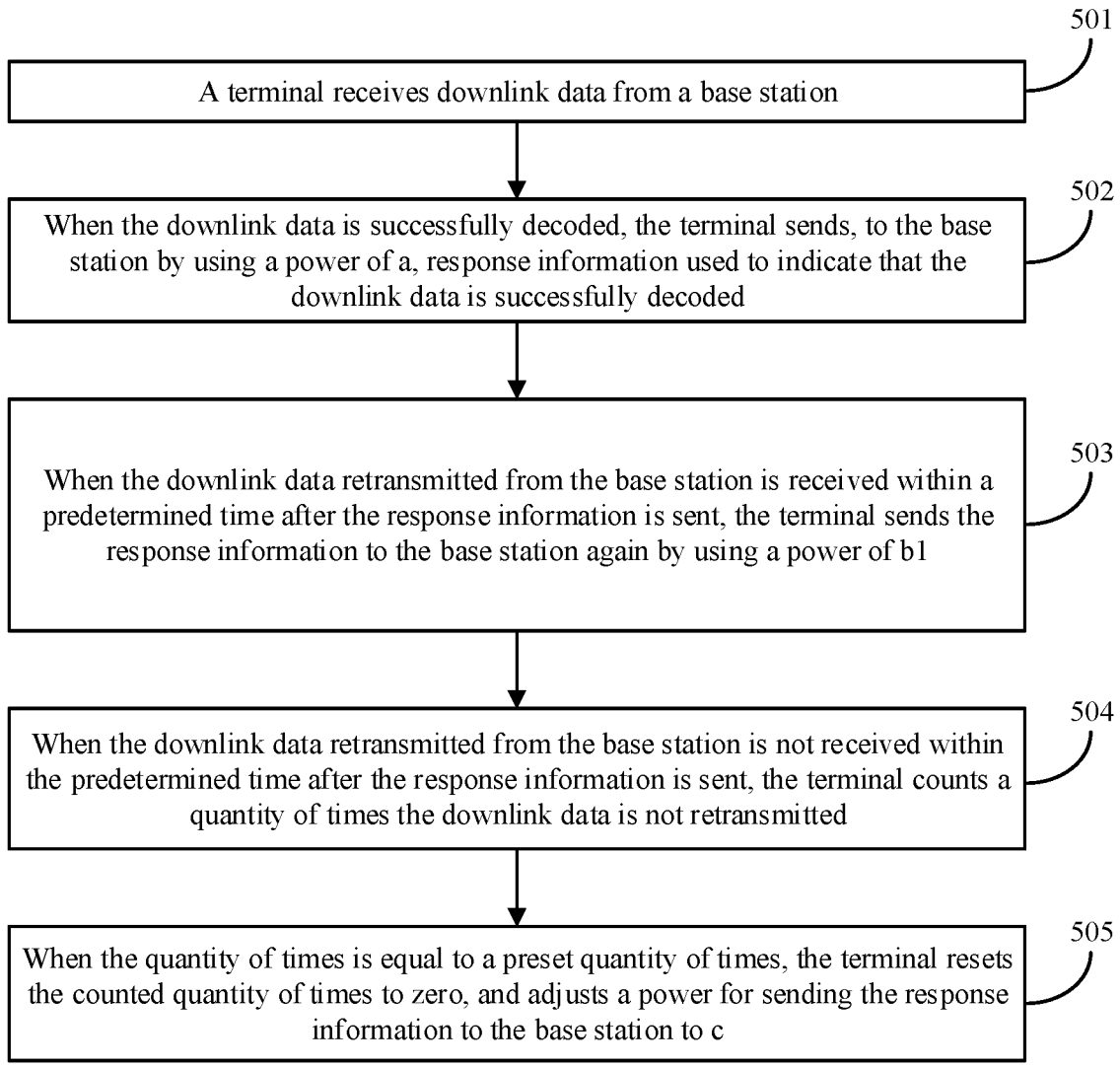
FIG. 5 is a schematic flowchart of still another power adjustment method according to an embodiment of the present invention.

Based on the network architecture shown in FIG. 1, FIG. 5 is a schematic flowchart of still another power adjustment method according to an embodiment of the present invention. As shown in FIG. 5, the power adjustment method may include the following steps.

501. A terminal receives downlink data from a base station.

502. When the downlink data is successfully decoded, the terminal sends, to the base station by using a power of a, response information used to indicate that the downlink data is successfully decoded.

In this embodiment, after the base station sends the downlink data to the terminal by using a physical downlink shared channel (PDSCH), and the terminal receives the downlink data, when the terminal successfully decodes the downlink data, the terminal sends, to the base station by using a PUCCH, the response information used to indicate that the downlink data is successfully decoded, in other words, the terminal sends an ACK to the base station; and when the base station fails to decode the response information, the base station determines that the terminal fails to receive the downlink data by using the PDSCH, and re-sends the downlink data to the terminal.

In this embodiment, the response information is transmitted by using the PUCCH, and a power for sending the response information is calculated by using Formula (1). When the terminal needs to send response information to a base station for the first time, initialization is performed, in other words, $[g^j(i)]$ is set to zero. In this case, the corresponding sending power is an initial power. After receiving the downlink data from the base station, when the downlink data is successfully decoded, the terminal may send, to the base station by using the power of a, the response information used to indicate that the decoding of downlink data succeeds. The power of a may be the initial power or a non-initial power.

503. When the downlink data retransmitted from the base station is received within a predetermined time after the response information is sent, the terminal sends the response information to the base station again by using a power of b1.

In this embodiment, when the downlink data retransmitted from the base station is received within the predetermined time after the response information is sent by using the power of a, the terminal may send the response information to the base station again by using the power of b1, where b1 is greater than a. In other words, when the response information sent by the terminal is not successfully decoded by the base station, or is not received by the base station, the terminal increases the sending power, and sends the response information again.

In this embodiment, when the downlink data retransmitted from the base station is received within the predetermined time after the response information is sent by using the power of a, the terminal may first count a quantity of times the response information is sent by using a same power, and determine whether the quantity of times is equal to a preset quantity of times. When the quantity of times is not equal to the preset quantity of times, the response information is sent to the base station again by using the power of a. When the quantity of times is equal to the preset quantity of times, the counted quantity of times the response information is sent by using the same power is reset to zero, and the response information is sent to the base station again by using the power of b1.

In this embodiment, when the downlink data retransmitted from the base station is received within the predetermined time after the response information is sent by using the power of a, or the terminal sends the response information the preset quantity of times by using the power of a, and when the downlink data retransmitted from the base station is received within the predetermined time after the response information is sent each of the preset quantity of times, a to-be-adjusted value may be first determined, and the response information is sent to the base station again by using the power of b1 only when the to-be-adjusted value is less than or equal to a first threshold. When the to-be-adjusted value is greater than the first threshold, the terminal sends the response information to the base station again by using the power of a. The to-be-adjusted value is equal to a sum of a previous adjustment value and a power increment, the power increment is a power increase used each time the terminal increases the sending power, and the previous adjustment value is a difference between a previous sending power and the initial power. When the power of a is the initial power, the to-be-adjusted value is the power increment. When the power of a is not the initial power, the to-be-adjusted value is a sum of the power increment and a difference between a and the initial power. The determining and sending of the first threshold are the same as the determining and sending of the threshold in the foregoing embodiments. Details are not described herein again.

504. When the downlink data retransmitted from the base station is not received within the predetermined time after the response information is sent, the terminal counts a quantity of times the downlink data is not retransmitted.

In this embodiment, when the downlink data retransmitted from the base station is not received within the predetermined time after the response information is sent by using the power of a, it indicates that the response information sent by the terminal is received and successfully decoded by the base station, and the terminal may count the quantity of times the downlink data is not retransmitted. When the downlink data retransmitted from the base station is not received within the predetermined time after the response information is sent by using the power of a, the power for sending the response information to the base station may be kept unchanged.

505. When the quantity of times is equal to the preset quantity of times, the terminal resets the counted quantity of times to zero, and adjusts the power for sending the response information to the base station to c.

In this embodiment, when the quantity of times the downlink data is not retransmitted is equal to the preset quantity of times, the terminal resets the counted quantity of times to zero, and may adjust the power for sending the response information to the base station to c, where c is less than a. Only when the sum of the previous adjustment value and the power increment is less than or equal to the first threshold, the terminal may count the quantity of times the downlink data is not retransmitted. When the sum of the previous adjustment value and the power increment is greater than the first threshold, the power for sending the response information to the base station may be kept unchanged. When the power of a is the initial power and the quantity of times is equal to the preset quantity of times, the terminal keeps the power of a unchanged, and when the power of a is not the initial power and the quantity of times is equal to the preset quantity of times, the power for sending the uplink data to the base station may be adjusted to c, where c needs to be greater than or equal to the initial power.

In this embodiment, when the quantity of times is equal to the preset quantity of times, a to-be-adjusted value may be first determined, and the power for sending the response information to the base station is adjusted to c only when the to-be-adjusted value is greater than or equal to a second threshold. When the to-be-adjusted value is less than the second threshold, the power for sending the response information to the base station may be kept unchanged. The to-be-adjusted value is equal to a difference between a previous adjustment value and a power decrement, and the power decrement is a power decrease used each time the terminal decreases the sending power. The to-be-adjusted value is the difference between the previous adjustment value (a difference between a and the initial power) and the power decrement. The power increment and the power decrement may be the same or may be different.

In this embodiment, when the downlink data retransmitted from the base station is not received within the predetermined time after the response information is sent to the base station by using the power of b1, the terminal may adjust, to a, the power for sending the response information to the base station. In other words, after the response information is successfully decoded by the base station, the sending power of the terminal may be adjusted to a power used before the response information is sent.

Figure 6:
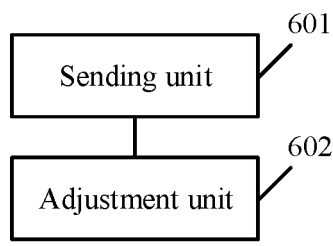
FIG. 6 is a schematic structural diagram of a terminal according to an embodiment of the present invention.

Based on the network architecture shown in FIG. 1, FIG. 6 is a schematic structural diagram of a terminal according to an embodiment of the present invention. As shown in FIG. 6, the terminal may include:

a sending unit 601, configured to send, by the terminal, an uplink resource request by using a power of a, where the sending unit 601 is further configured to: if no resource allocation signaling is received within a predetermined time after the uplink resource request is sent, send the uplink resource request again by using a power of b1, where b1 is greater than a.

In one example implementation, the sending unit 601 is further configured to: if no resource allocation signaling is received within the predetermined time after the uplink resource request is sent by using the power of b1, send the uplink resource request again by using a power of b2, where b2 is greater than b1.

In one example implementation, $b2-b1=b1-a=\delta$.

In one example implementation, a difference between b1 and a does not exceed a threshold, and/or a difference between b2 and a does not exceed the threshold.

In one example implementation, the threshold is determined in one or more of the following manners:

The threshold is a fixed value.

The threshold is a value obtained through calculation based on the power of a.

In one example implementation, the terminal may further include:

an adjustment unit 602, configured to: if resource allocation signaling is received within the predetermined time after the sending unit 601 sends the uplink resource request by using the power of b1 or b2, adjust a power for the uplink resource request to a.

In one example implementation, the sending unit 601 is further configured to: when there is a to-be-sent uplink resource request, and a time difference between a current time and a sending time of a previous uplink resource request is greater than or equal to two periods, send the to-be-sent uplink resource request by using the power of a.

In addition, the terminal may further perform the method steps performed by the terminal in FIG. 2, and may further include other units that perform the method steps performed by the terminal in FIG. 2. Details are not described herein again.

Figure 7:
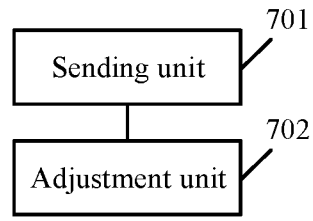
FIG. 7 is a schematic structural diagram of another terminal according to an embodiment of the present invention.

Based on the network architecture shown in FIG. 1, FIG. 7 is a schematic structural diagram of another terminal according to an embodiment of the present invention. As shown in FIG. 7, the terminal may include:

a sending unit 701, configured to send an uplink resource request by using a power of a, where the sending unit 701 is further configured to: if no resource allocation signaling is received within a predetermined time after the uplink resource request is sent, send the uplink resource request again by using the power of a; and the sending unit 701 is further configured to: if the uplink resource request is sent n times by using the power of a, and no resource allocation signaling is received within the predetermined time after the uplink resource request is sent each of the n times, send the uplink resource request again by using a power of b1, where b1 is greater than a, and n is greater than or equal to 2.

In one example implementation, the sending unit 701 is further configured to: if the uplink resource request is sent n times by using the power of b1, and no resource allocation signaling is received within the predetermined time after the uplink resource request is sent each of then n times, send the uplink resource request again by using a power of b2, where b2 is greater than b1.

In one example implementation, $b2-b1=b1-a=\delta$.

In one example implementation, a difference between b1 and a does not exceed a threshold, and/or a difference between b2 and a does not exceed the threshold.

In one example implementation, the threshold is determined in one or more of the following manners:

The threshold is a fixed value.

The threshold is a value obtained through calculation based on the power of a.

In one example implementation, the terminal may further include:

an adjustment unit 702, configured to: if resource allocation signaling is received within the predetermined time after the sending unit 701 sends the uplink resource request by using the power of b1 or b2, adjust a power for the uplink resource request to a.

In one example implementation, the sending unit 701 is further configured to: when there is a to-be-sent uplink resource request, and a time difference between a current time and a sending time of a previous uplink resource request is greater than or equal to two periods, send the to-be-sent uplink resource request by using the power of a.

In addition, the terminal may further perform the method steps performed by the terminal in FIG. 3, and may further include other units that perform the method steps performed by the terminal in FIG. 2. Details are not described herein again.

Figure 8:
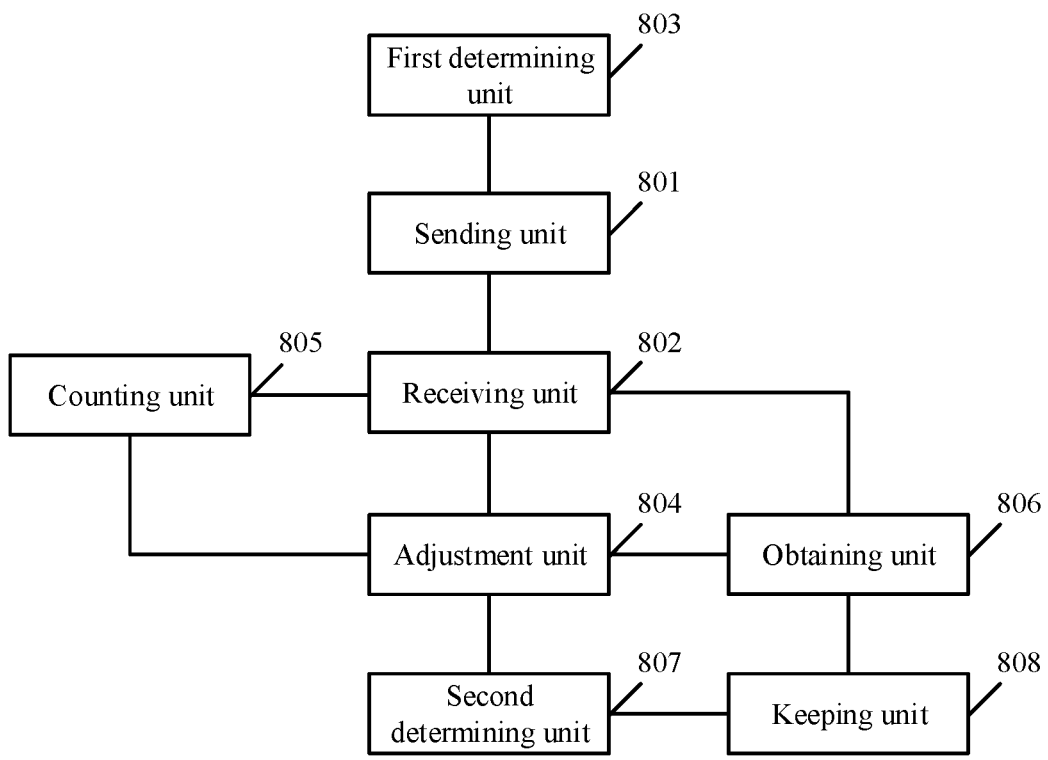
FIG. 8 is a schematic structural diagram of still another terminal according to an embodiment of the present invention.

Based on the network architecture shown in FIG. 1, FIG. 8 is a schematic structural diagram of still another terminal according to an embodiment of the present invention. As shown in FIG. 8, the terminal may include:

a sending unit 801, configured to send uplink data to a base station by using a power of a; and a receiving unit 802, configured to receive response information from the base station, where the sending unit 801 is further configured to: when the response information received by the receiving unit 802 is information used to indicate that the uplink data is not successfully decoded, send the uplink data to the base station again by using a power of b1, where b1 is greater than a.

In one example implementation, when the response information received by the receiving unit 802 is the information used to indicate that the uplink data is not successfully decoded, the terminal may further include:

a first determining unit 803, configured to determine a to-be-adjusted value.

That the sending unit 801 sends the uplink data to the base station again by using a power of b1 includes:

when the to-be-adjusted value determined by the determining unit 803 is less than or equal to a first threshold, sending the uplink data to the base station again by using the power of b1.

In one example implementation, the sending unit 801 is further configured to: when the to-be-adjusted value determined by the determining unit 803 is greater than the first threshold, send the uplink data to the base station again by using the power of a.

In one example implementation, the terminal may further include:

an adjustment unit 804, configured to: when the response information received by the receiving unit 802 is information used to indicate that the uplink data is successfully decoded, adjust a power for sending the uplink data to the base station to c, where c is less than a.

In one example implementation, when the response information received by the receiving unit 802 is the information used to indicate that the uplink data is successfully decoded, the terminal may further include:

a counting unit 805, configured to count a quantity of times the response information received by the receiving unit 802 is the information used to indicate that the uplink data is successfully decoded.

The adjustment unit 804 is configured to: when the quantity of times counted by the counting unit 805 is equal to a preset quantity of times, reset the counted quantity of times to zero, and adjust the power for sending the uplink data to the base station to c.

In one example implementation, the counting unit 805 is specifically configured to: when a sum of a previous adjustment value and a power increment is less than or equal to a first threshold, count a quantity of times the response information is the information used to indicate that the uplink data is successfully decoded, where the power increment is a power increase used each time the terminal increases the sending power.

The adjustment unit 804 is specifically configured to: when the sum is less than or equal to the first threshold, adjust the power for sending the uplink data to the base station to c.

In one example implementation, when the response information received by the receiving unit 802 is the information used to indicate that the uplink data is successfully decoded, the terminal may further include:

an obtaining unit 806, configured to obtain a path loss value.

The adjustment unit 804 is specifically configured to: when the path loss value obtained by the obtaining unit 806 is less than or equal to a second threshold, adjust the power for sending the uplink data to the base station to c.

In one example implementation, the terminal may further include:

a second determining unit 807, configured to determine a to-be-adjusted value.

The adjustment unit 804 is specifically configured to: when the to-be-adjusted value determined by the second determining unit 807 is greater than or equal to a third threshold, adjust the power for sending the uplink data to the base station to c.

In one example implementation, a keeping unit 808 is configured to: when the sum is greater than the first threshold, or the path loss value obtained by the obtaining unit 806 is greater than the second threshold, or the to-be-adjusted value determined by the second determining unit 807 is less than the third threshold, keep the power for sending the uplink data to the base station unchanged.

In addition, the terminal may further perform the method steps performed by the terminal in FIG. 4, and may further include other units that perform the method steps performed by the terminal in FIG. 2. Details are not described herein again.

Figure 9:
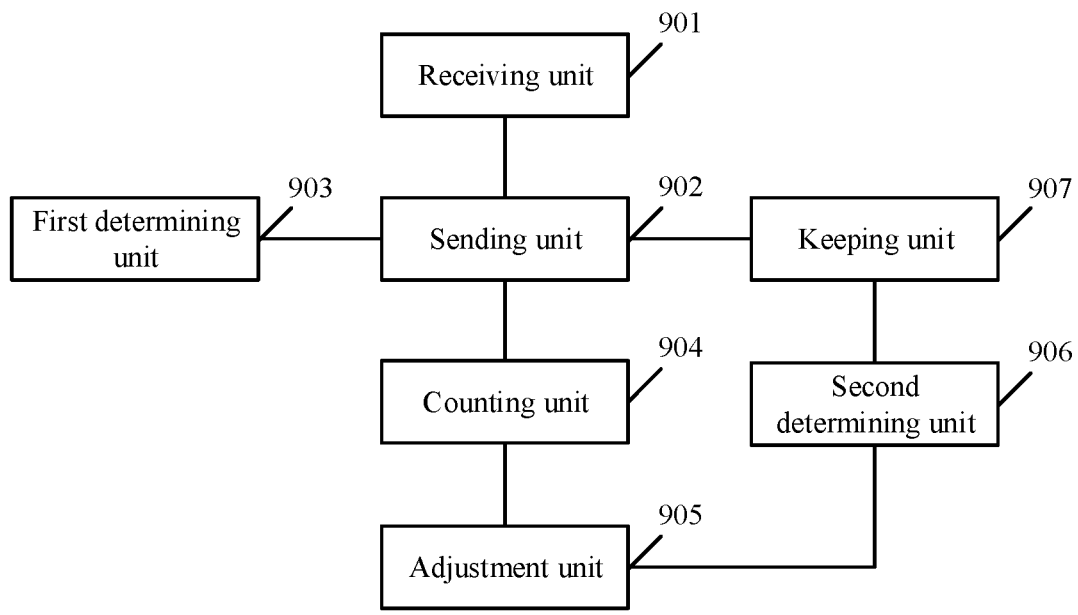
FIG. 9 is a schematic structural diagram of still another terminal according to an embodiment of the present invention.

Based on the network architecture shown in FIG. 1, FIG. 9 is a schematic structural diagram of still another terminal according to an embodiment of the present invention. As shown in FIG. 9, the terminal may include:

a receiving unit 901, configured to receive downlink data from a base station; and a sending unit 902, configured to: when decoding of the downlink data received by the receiving unit 901 succeeds, send, to the base station by using a power of a, response information used to indicate that the downlink data is successfully decoded, where the sending unit 902 is further configured to: when the downlink data retransmitted from the base station is received within a predetermined time after the response information is sent, send the response information to the base station again by using a power of b1, where b1 is greater than a.

In one example implementation, the sending unit 902 is further configured to: when the downlink data retransmitted from the base station is received within the predetermined time after the response information is sent, send the response information to the base station again by using the power of a.

The sending unit 902 is further configured to: when the response information is sent a preset quantity of times by using the power of a and the downlink data retransmitted from the base station is received within the predetermined time after the response information is sent each of the preset quantity of times, send the response information to the base station again by using the power of b1.

In one example implementation, the terminal may further include:

a first determining unit 903, configured to determine a to-be-adjusted value.

That the sending unit 902 sends the response information to the base station again by using the power of b1 includes:

when the to-be-adjusted value determined by the first determining unit 903 is less than or equal to a first threshold, sending the response information to the base station again by using the power of b1.

In one example implementation, the sending unit 902 is further configured to: when the to-be-adjusted value determined by the first determining unit 903 is greater than the first threshold, send the response information to the base station again by using the power of a.

In one example implementation, the terminal may further include:

a counting unit 904, configured to: when the downlink data retransmitted from the base station is not received within the predetermined time after the sending unit 902 sends the response information, count a quantity of times the downlink data is not retransmitted; and an adjustment unit 905, configured to: when the quantity of times counted by the counting unit 904 is equal to the preset quantity of times, reset the counted quantity of times to zero, and adjust the power for sending the response information to the base station to c, where c is less than a.

In one example implementation, that the counting unit 904 counts a quantity of times the downlink data is not retransmitted includes:

when a sum of a previous adjustment value and a power increment is less than or equal to the first threshold, counting the quantity of times the downlink data is not retransmitted, where the power increment is a power increase used each time the terminal increases the sending power.

In one example implementation, the terminal may further include:

a second determining unit 906, further configured to determine a to-be-adjusted value, where that the adjustment unit 905 adjusts the power for sending the response information to the base station to c includes:

when the to-be-adjusted value determined by the second determining unit 906 is greater than or equal to a second threshold, adjusting the power for sending the response information to the base station to c; and a keeping unit 907, configured to: when the downlink data retransmitted from the base station is not received within the predetermined time after the sending unit 902 sends the response information, or the to-be-adjusted value determined by the second determining unit 906 is less than the second threshold, or the sum is greater than the first threshold, keep the power for sending the response information to the base station unchanged.

In one example implementation, the adjustment unit 905 is further configured to: when the downlink data retransmitted from the base station is not received within the predetermined time after the response information is sent to the base station by using the power of b1, adjust, to a, the power for sending the response information to the base station.

In addition, the terminal may further perform the method steps performed by the terminal in FIG. 5, and may further include other units that perform the method steps performed by the terminal in FIG. 2. Details are not described herein again.

Figure 10:
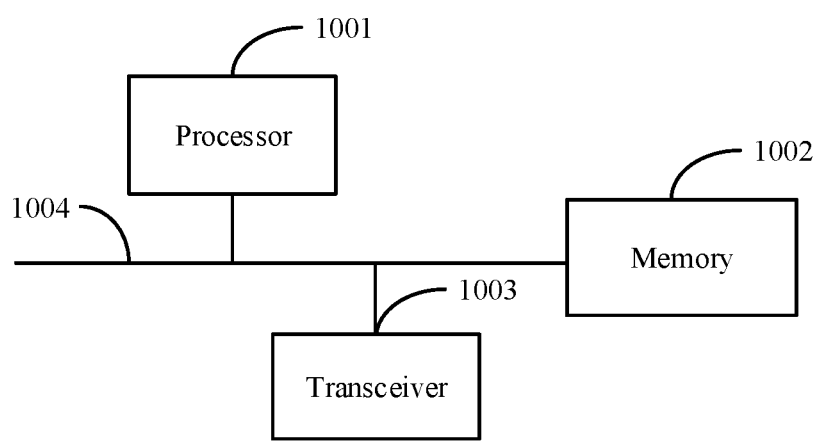
FIG. 10 is a schematic structural diagram of still another terminal according to an embodiment of the present invention.

FIG. 10 is a schematic structural diagram of still another terminal according to an embodiment of the present invention. As shown in FIG. 10, the terminal may include a processor 1001, a memory 1002, a transceiver 1003, and a bus 1004. The processor 1001 may be a general-purpose central processing unit (CPU), a plurality of CPUs, a microprocessor, an application-specific integrated circuit (ASIC), or one or more integrated circuits that are configured to control program execution of solutions of the present invention. The memory 1002 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, or the like), a magnetic disk storage medium, or another magnetic storage device, or any other medium that can be used to carry or store expected program code in a form of an instruction or a data structure and that can be accessed by a computer. This is not limited thereto. The memory 1002 may exist alone, and the bus 1004 is connected to the processor 1001. Alternatively, the memory 1002 may be integrated with the processor 1001. The bus 1004 may include a channel, used to transmit information between the foregoing components. The transceiver 1003 may be a transceiver antenna, or may be another transceiver component.

In an embodiment, the transceiver 1003 is configured to send an uplink resource request by using a power of a.

The transceiver 1003 is further configured to: if no resource allocation signaling is received within a predetermined time after the uplink resource request is sent, send the uplink resource request again by using a power of b1, where b1 is greater than a.

In one example implementation, the transceiver 1003 is further configured to: if no resource allocation signaling is received within the predetermined time after the uplink resource request is sent by using the power of b1, send the uplink resource request again by using a power of b2, where b2 is greater than b1.

In one example implementation, $b2-b1=b1-a=\delta$.

In one example implementation, a difference between b1 and a does not exceed a threshold, and/or a difference between b2 and a does not exceed the threshold.

In one example implementation, the threshold is determined in one or more of the following manners:

The threshold is a fixed value.

The threshold is a value obtained through calculation based on the power of a.

In one example implementation, the memory 1002 stores a set of program code, and the processor 1001 is configured to invoke the program code stored in the memory 1002, so as to perform the following operation:

if resource allocation signaling is received within the predetermined time after the uplink resource request is sent by using the power of b1 or b2, adjust a power for the uplink resource request to a.

In one example implementation, the transceiver 1003 is further configured to: when there is a to-be-sent uplink resource request, and a time difference between a current time and a sending time of a previous uplink resource request is greater than or equal to two periods, send the to-be-sent uplink resource request by using the power of a.

In another embodiment, the transceiver 1003 is configured to send an uplink resource request by using a power of a.

The transceiver 1003 is further configured to: if no resource allocation signaling is received within a predetermined time after the uplink resource request is sent, send the uplink resource request again by using the power of a.

The transceiver 1003 is further configured to: if the uplink resource request is sent n times by using the power of a, and no resource allocation signaling is received within the predetermined time after the uplink resource request is sent each of the n times, send the uplink resource request again by using a power of b1, where b1 is greater than a, and n is greater than or equal to 2.

In one example implementation, the transceiver 1003 is further configured to: if the uplink resource request is sent n times by using the power of b1, and no resource allocation signaling is received within the predetermined time after the uplink resource request is sent each of the n times, send the uplink resource request again by using a power of b2, where b2 is greater than b1.

In one example implementation, $b2-b1=b1-a=\delta$.

In one example implementation, a difference between b1 and a does not exceed a threshold, and/or a difference between b2 and a does not exceed the threshold.

In one example implementation, the threshold is determined in one or more of the following manners:

The threshold is a fixed value.

The threshold is a value obtained through calculation based on the power of a.

In one example implementation, the memory 1002 stores a set of program code, and the processor 1001 is configured to invoke the program code stored in the memory 1002, so as to perform the following operation:

if resource allocation signaling is received within the predetermined time after the uplink resource request is sent by using the power of b1 or b2, adjust a power for the uplink resource request to a.

In one example implementation, the transceiver 1003 is further configured to: when there is a to-be-sent uplink resource request, and a time difference between a current time and a sending time of a previous uplink resource request is greater than or equal to two periods, send the to-be-sent uplink resource request by using the power of a.

In still another embodiment, the transceiver 1003 is configured to send uplink data to a base station by using a power of a.

The transceiver 1003 is further configured to receive response information from the base station.

The transceiver 1003 is further configured to: when the response information is information used to indicate that the uplink data is not successfully decoded, send the uplink data to the base station again by using a power of b1, where b1 is greater than a.

In one example implementation, the memory 1002 stores a set of program code, and the processor 1001 is configured to invoke the program code stored in the memory 1002, so as to perform the following operation:

when the response information is the information used to indicate that the uplink data is not successfully decoded, determining a to-be-adjusted value.

That the transceiver 1003 sends the uplink data to the base station again by using a power of b1 includes:

when the to-be-adjusted value is less than or equal to a first threshold, sending the uplink data to the base station again by using the power of b1.

In one example implementation, the transceiver 1003 is further configured to: when the to-be-adjusted value is greater than the first threshold, send the uplink data to the base station again by using the power of a.

In one example implementation, the transceiver 1003 is further configured to: when the response information is information used to indicate that the uplink data is successfully decoded, adjust a power for sending the uplink data to the base station to c, where c is less than a.

In one example implementation, the processor 1001 is further configured to invoke the program code stored in the memory 1002 to perform the following operations:

when the response information is the information used to indicate that the uplink data is successfully decoded, counting a quantity of times the response information is the information used to indicate that the uplink data is successfully decoded; and when the quantity of times is equal to a preset quantity of times, resetting the counted quantity of times to zero, and adjusting the power for sending the uplink data to the base station to c.

In one example implementation, the processor 1001 is further configured to invoke the program code stored in the memory 1002 to perform the following operation:

when a sum of a previous adjustment value and a power increment is less than or equal to a first threshold, counting a quantity of times the response information is the information used to indicate that the uplink data is successfully decoded, or adjusting the power for sending the uplink data to the base station to c, where the power increment is a power increase used each time the terminal increases the sending power.

In one example implementation, the processor 1001 is further configured to invoke the program code stored in the memory 1002 to perform the following operations:

when the response information is the information used to indicate that the uplink data is successfully decoded, obtaining a path loss value; and when the path loss value is less than or equal to a second threshold, adjusting the power for sending the uplink data to the base station to c.

In one example implementation, the processor 1001 is further configured to invoke the program code stored in the memory 1002 to perform the following operation:

determining a to-be-adjusted value.

That the processor 1001 adjusts the power for sending the uplink data to the base station to c includes:

when the to-be-adjusted value is greater than or equal to a third threshold, adjusting the power for sending the uplink data to the base station to c.

In one example implementation, the processor 1001 is further configured to invoke the program code stored in the memory 1002 to perform the following operation:

when the sum is greater than the first threshold, or the path loss value is greater than the second threshold, the to-be-adjusted value is less than the third threshold, keeping the power for sending the uplink data to the base station unchanged.

In still another embodiment, the transceiver 1003 is configured to receive downlink data from a base station.

The transceiver 1003 is further configured to: when the downlink data is successfully decoded, send, to the base station by using a power of a, response information used to indicate that the downlink data is successfully decoded.

The transceiver 1003 is further configured to: when the downlink data retransmitted from the base station is received within a predetermined time after the response information is sent, send the response information to the base station again by using a power of b1, where b1 is greater than a.

In one example implementation, the transceiver 1003 is further configured to: when the downlink data retransmitted from the base station is received within the predetermined time after the response information is sent, send the response information to the base station again by using the power of a.

The transceiver 1003 is further configured to: when the response information is sent a preset quantity of times by using the power of a and the downlink data retransmitted from the base station is received within the predetermined time after the response information is sent each of the preset quantity of times, send the response information to the base station again by using the power of b1.

In one example implementation, the memory 1002 stores a set of program code, and the processor 1001 is configured to invoke the program code stored in the memory 1002, so as to perform the following operation:

determining a to-be-adjusted value.

That the transceiver 1003 sends the response information to the base station again by using the power of b1 includes:

when the to-be-adjusted value is less than or equal to a first threshold, sending the response information to the base station again by using the power of b1.

In one example implementation, the transceiver 1003 is further configured to: when the to-be-adjusted value is greater than the first threshold, send the response information to the base station again by using the power of a.

In one example implementation, the processor 1001 is further configured to invoke the program code stored in the memory 1002 to perform the following operations:

when the downlink data retransmitted from the base station is not received within the predetermined time after the response information is sent, counting a quantity of times the downlink data is not retransmitted; and when the quantity of times is equal to the preset quantity of times, resetting the counted quantity of times to zero, and adjusting the power for sending the response information to the base station to c, where c is less than a.

In one example implementation, that the processor 1001 counts a quantity of times the downlink data is not retransmitted includes:

when a sum of a previous adjustment value and a power increment is less than or equal to the first threshold, counting the quantity of times the downlink data is not retransmitted, where the power increment is a power increase used each time the terminal increases the sending power.

In one example implementation, the processor 1001 is further configured to invoke the program code stored in the memory 1002 to perform the following operations:

determining a to-be-adjusted value; and when the downlink data retransmitted from the base station is not received within the predetermined time after the response information is sent, or the to-be-adjusted value is less than a second threshold, or the sum is greater than the first threshold, keeping the power for sending the response information to the base station unchanged.

That the processor 1001 adjusts the power for sending the response information to the base station to c includes:

when the to-be-adjusted value is greater than or equal to the second threshold, adjusting the power for sending the response information to the base station to c.

In one example implementation, the processor 1001 is further configured to invoke the program code stored in the memory 1002 to perform the following operation:

when the downlink data retransmitted from the base station is not received within the predetermined time after the response information is sent to the base station by using the power of b1, adjusting, to a, the power for sending the response information to the base station.

It should be understood that the terminal in this embodiment of the present invention may be corresponding to the terminals shown in FIG. 6 to FIG. 9, and may be corresponding to the terminals in FIG. 2 to FIG. 5, and the foregoing and other operations and/or functions of the modules in the terminal are separately used to implement corresponding procedures of the methods in FIG. 2 to FIG. 5. For brevity, details are not described herein again.

An embodiment of the present invention further discloses a storage medium. The storage medium stores a program. When the program is run, the power adjustment methods shown in FIG. 2 to FIG. 5 are implemented.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A power adjustment method, comprising:
    sending, by a terminal, an uplink resource request by using a power of a;
    if no resource allocation signaling is received by the terminal within a predetermined time after the uplink resource request is sent, sending, by the terminal, the uplink resource request again by using a power of b1, wherein b1 is greater than a; and as a result of the resource allocation signaling being received by the terminal within the predetermined time after the uplink resource request is sent by the terminal again using the power of b1, decreasing the power for sending the uplink resource request again.

2. The method according to claim 1, wherein the method further comprises:
if no resource allocation signaling is received by the terminal within the predetermined time after the terminal sends the uplink resource request by using the power of b1, sending, by the terminal, the uplink resource request again by using a power of b2, wherein b2 is greater than b1.

3. The method according to claim 1, further comprising:
when there is a to-be-sent uplink resource request, and a time difference between a current time and a sending time of a previous uplink resource request is greater than or equal to two periods, sending, by the terminal, the to-be-sent uplink resource request by using the power of a.

4. The method according to claim 1, wherein a value of the decreased sending power is greater than or equal to the power of a.

5. A power adjustment method, comprising:
sending, by a terminal, an uplink resource request by using a power of a;
as a result of resource allocation signaling being received by the terminal within a predetermined time after the uplink resource request is sent, counting a quantity of times the uplink resource request is sent by using a same power, the same power being the power of a, and sending, by the terminal, the uplink resource request again by using the power of a; and
determing if the counted quantity of times is n times, wherein n is greater than or equal to 2
as a result of the terminal sending the uplink resource request the n times by using the same power of a as determined by the counted quantity of times, and no resource allocation signaling is received by the terminal within the predetermined time after the uplink resource request is sent each of the n times, sending, by the terminal, the uplink resource request again by using a power of b1, wherein b1 is greater than a.

6. The method according to claim 5, further comprising:
if the terminal sends the uplink resource request n times by using the power of b1, and no resource allocation signaling is received by the terminal within the predetermined time after the uplink resource request is sent each of the n times, sending, by the terminal, the uplink resource request again by using a power of b2, wherein b2 is greater than b1.

7. The method according to claim 6, wherein b2−b1=b1−a=δ.

8. The method according to claim 5, wherein a difference between b1 and a does not exceed a threshold, and/or a difference between b2 and a does not exceed the threshold.

9. The method according to claim 8, wherein the threshold is determined in one or more of the following manners:
the threshold is a fixed value; and/or
the threshold is a value obtained through calculation based on the power of a.

10. The method according to claim 5, further comprising:
if the terminal receives resource allocation signaling within the predetermined time after the terminal sends the uplink resource request by using the power of b1 or b2, adjusting, by a terminal, a power for the uplink resource request to a.

11. The method according to claim 5, further comprising:
when there is a to-be-sent uplink resource request, and a time difference between a current time and a sending time of a previous uplink resource request is greater than or equal to two periods, sending, by the terminal, the to-be-sent uplink resource request by using the power of a.

12. The method according to claim 5, wherein the predetermined time is a time interval between a time after the uplink resource request is sent and a time before the next uplink resource request is to be sent.

13. The method according to claim 5, wherein:
a difference between b1 and a does not exceed a threshold, and a difference between b2 and a does not exceed the threshold;
the threshold is a value obtained through calculation based on the power of a.

14. A power adjustment method, comprising:
sending, by a terminal, uplink data to a base station by using a power of a;
receiving, by the terminal, response information from the base station;
when the response information is information used to indicate that the uplink data is not successfully decoded, sending, by the terminal, the uplink data to the base station again by using a power of b1, wherein b1 is greater than a; and
when the response information indicates that the uplink data is successfully decoded, adjusting, by the terminal, a power for sending the uplink data to the base station to c, wherein c is less than a.

15. The method according to claim 14, wherein when the response information is the information used to indicate that the uplink data is not successfully decoded, the method further comprises:
determining, by the terminal, a to-be-adjusted value; and, wherein
sending, by the terminal, the uplink data to the base station again by using the power of b1 comprises:
when the to-be-adjusted value is less than or equal to a first threshold, sending, by the terminal, the uplink data to the base station again by using the power of b1.

16. The method according to claim 15, wherein the method further comprises:
when the to-be-adjusted value is greater than the first threshold, sending, by the terminal, the uplink data to the base station again by using the power of a.

17. The method according to claim 14, wherein when the response information is the information indicating that the uplink data is successfully decoded, the method further comprises:
counting, by the terminal, a quantity of times the response information is the information used to indicate the uplink data is successfully decoded;
when the quantity of times is equal to a preset quantity of times, resetting, by the terminal, the counted quantity of times to zero, and adjusting the power for sending the uplink data to the base station to c.

18. The method according to claim 17, wherein the method further comprises:
when a sum of a previous adjustment value and a power increment is less than or equal to a first threshold, counting, by the terminal, a quantity of times the response information is the information indicating that the uplink data is successfully decoded, or adjusting the power for sending the uplink data to the base station to c.

19. A terminal, comprising a processor, a memory, and a transceiver, wherein
the transceiver is configured to receive and send data, and the memory is configured to store program code, and the processor is configured to execute the program code, and when the processor executes the program code stored in the memory, the processor is enabled to perform the power adjustment method according to claim 5.

\* \* \* \* \*

UNITED STATES PATENT AND TRADEMARK OFFICE
CERTIFICATE OF CORRECTION

PATENT NO. : 11,412,463 B2
APPLICATION NO. : 17/259150
DATED : August 9, 2022
INVENTOR(S) : Yun Liu It is certified that error appears in the above-identified patent and that said Letters Patent is hereby corrected as shown below:

On the Title Page

Under U.S. Patent Documents, please add the following references:
2011/0188422 A1    8/2011    Ostergaard
2014/0198736 A1    7/2014    Shukair Under Foreign Patent Documents, please add the following references:
CN    103733718 A    4/2014
CN    101489257 A    7/2009
WO    2008156321 A2    12/2008
WO    2008110104 A1    9/2008
CN    102143568 A    8/2011
WO    2015069013 A1    5/2015
WO    2017191919 A1    11/2017
CN    104838717 A    8/2015
CN    103327596 A    9/2013
CN    105263191 A    1/2016
CN    103796320 A    5/2014
CN    107529217 A    12/2017
WO    2018106067 A1    6/2018
CN    107801236 A    3/2018

Under Non-Patent Literature Documents, please add the following references:
3GPP TS 36.213 V14.7.0 (2018-07), 3rd Generation Partnership Project;
Technical Specification Group Radio Access Network; Evolved Universal Terrestrial
Radio Access (E-UTRA); Physical layer procedures(Release 14), March 2011. total 469
pages.

Signed and Sealed this
Sixth Day of September, 2022

Katherine Kelly Vidal
*Director of the United States Patent and Trademark Office*